United States Patent
P et al.

(10) Patent No.: US 11,165,695 B1
(45) Date of Patent: Nov. 2, 2021

(54) IDENTIFYING EGRESS OF NIL FORWARD EQUIVALENCY CLASS (FEC) USED FOR FEC HIDING

(71) Applicant: Juniper Networks, Inc., Sunnyvale, CA (US)

(72) Inventors: Arunkumar P, Bangalore (IN); Deepti Nirmalkumarji Rathi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/850,639

(22) Filed: Apr. 16, 2020

(51) Int. Cl.
*H04L 12/723* (2013.01)
*H04L 12/733* (2013.01)
*H04L 12/801* (2013.01)
*H04L 12/911* (2013.01)
*H04L 12/703* (2013.01)

(52) U.S. Cl.
CPC ............ *H04L 45/507* (2013.01); *H04L 45/20* (2013.01); *H04L 45/28* (2013.01); *H04L 47/17* (2013.01); *H04L 47/825* (2013.01)

(58) Field of Classification Search
CPC ....... H04L 45/507; H04L 45/28; H04L 45/20; H04L 47/825; H04L 47/17
See application file for complete search history.

(56) References Cited

U.S. PATENT DOCUMENTS

| 10,044,603 | B1 * | 8/2018 | Singh | H04L 45/50 |
| 2011/0317696 | A1 * | 12/2011 | Aldrin | H04L 12/1881 370/390 |
| 2014/0362846 | A1 * | 12/2014 | Li | H04L 12/4633 370/338 |

OTHER PUBLICATIONS

Bahadur et al., RFC 6424 (IETF, https://tools.ietf.org/html/rfc6424), pp. 1-24, Nov. 2011 (Year: 2011).*
Kompella et al., "Detecting Multiprotocol Label Switched (MPLS) Data-Plane Failures," Internet Engineering Task Force (IETF), RFC 8029, Mar. 2017, 79 pp.
Bahadur et al., "Mechanism for Performing Label Switched Path Ping (LSP Ping) over MPLS Tunnels," Internet Engineering Task Force (IETF), RFC 6424, Nov. 2011, 24 pp.

* cited by examiner

Primary Examiner — Yaotang Wang
(74) Attorney, Agent, or Firm — Shumaker & Sieffert, P.A.

(57) ABSTRACT

A label switch router (LSR) in a label-switched path (LSP) may receive, from an ingress edge LSR, a Multi-Protocol Label Switching (MPLS) echo request, where the LSP includes a tunnel having details that are hidden by a Nil Forward Equivalency Class (FEC). The LSR may determine whether the LSR is an egress node for the tunnel in the LSP based at least in part on one or more labels in the MPLS echo request. The LSR may, in response to determining that the LSR is the egress node for the tunnel in the LSP, send an MPLS echo reply that indicates the LSR as being the egress node for the tunnel in the LSP.

18 Claims, 12 Drawing Sheets

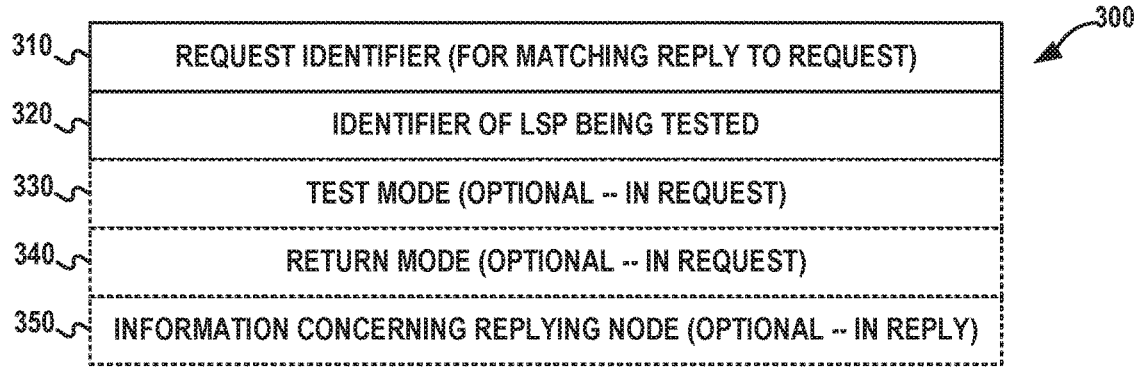
FIG. 3
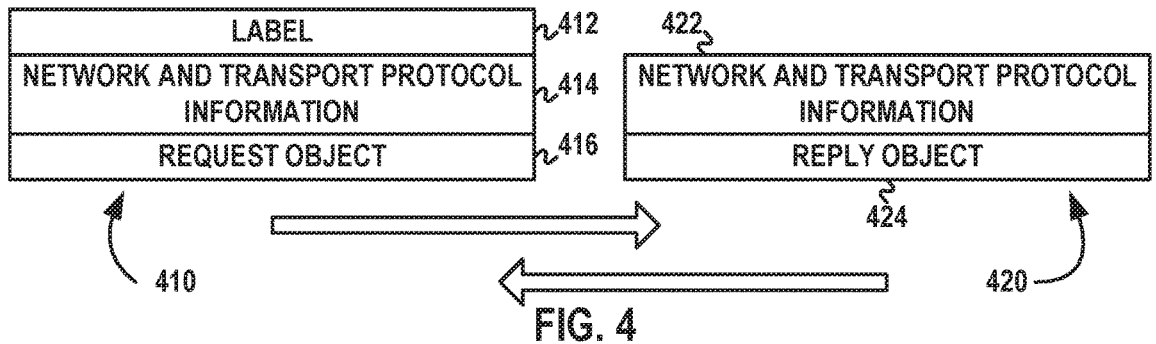
FIG. 4
FIG. 5

IDENTIFYING EGRESS OF NIL FORWARD EQUIVALENCY CLASS (FEC) USED FOR FEC HIDING

TECHNICAL FIELD

The invention relates to computer networks and, more particularly, to detecting and diagnosing errors in computer network connections, such as multi-protocol label switching (MPLS) label-switched paths (LSPs).

BACKGROUND

Multiprotocol Label Switching (MPLS) ping and traceroute are tools for detecting MPLS data plane failure and validating data planes against control planes. While MPLS ping is used to check the reachability of an MPLS tunnel, MPLS traceroute is used for isolating data plane failure and for detecting whether the data plane and the control plane are out of sync.

Forwarding Equivalence Class (FEC) is used to uniquely identify an MPLS session on a Label Switching Router (LSR). An MPLS echo request carries information about the FEC whose MPLS path is being verified. This echo request is forwarded just like any other packet belonging to that FEC. In "ping" mode (basic connectivity check), the packet should reach the end of the path, at which point it is sent to the control plane of the egress edge LSR, which then verifies whether it is indeed an egress for the FEC. In "traceroute" mode (fault isolation), the packet is sent to the control plane of each transit LSR, which performs various checks that it is indeed a transit LSR for this path. Each LSR also returns further information that for checking the control plane against the data plane (i.e., checking that forwarding matches what the routing protocols determined as the path).

SUMMARY

This disclosure describes techniques for detecting failures (e.g., data plane failures) in MPLS Label-Switched Paths (LSPs). In particular, this disclosure describes techniques for identifying the egress of one or more tunnels within an LSP during performance of a MPLS traceroute for the LSP when one or more LSRs in the LSP hide the details of such one or more tunnels via use of Nil FEC. By hiding the details of the one or more tunnels via Nil FEC, an ingress node of one or more tunnels may hide information such as the egress nodes of the one or more tunnels.

MPLS ping and traceroute are described in Bahadur, et al., "Mechanism for Performing Label Switched Path Ping (LSP Ping) over MPLS Tunnels," Internet Engineering Task Force (IETF) Request for Comments (RFC) 6424, November 2011 (hereafter "RFC 6242") and Kompella et al., "Detecting Multiprotocol Label Switched (MPLS) Data-Plane Failures," IEFC RFC 8029, March 2017 (hereafter "RFC 8029"). To perform MPLS traceroute for a MPLS LSP, an ingress edge LSR of the LSP may send an MPLS echo request to each LSR in the LSP and each LSR may, in response to receiving an MPLS echo request, send an MPLS echo reply back to the ingress edge LSR.

When an LSR is an ingress node for a tunnel in the LSP, the LSR may, in response to receiving an MPLS echo request, send an MPLS echo reply indicating the details of the tunnel that starts at the LSP. A LSR downstream to the ingress node for the tunnel in the LSP may use such details provided by the ingress node of the tunnel to determine that the LSR is the egress node for the tunnel and may, in response to receiving an MPLS echo request, send an MPLS echo reply back to the ingress edge LSR indicating that the LSR is the egress node for the tunnel. However, in some examples, an LSR that is an ingress node for a tunnel in the LSP may use Nil FEC to hide the details of the tunnel, such as details regarding the egress node for the tunnel. As such, a LSR that is downstream to the ingress node for the tunnel may be unable to rely on the details of the tunnel provided by the ingress node to determine whether the LSR is the egress node for the tunnel.

RFC 6242 describes one technique for determining whether a LSR is the egress node for a tunnel in the LSP that has its details hidden by Nil FEC. In particular, in RFC 6242, a LSR may determine that it is the egress node for a tunnel if the number of labels towards next-hop is decreasing. An MPLS echo request that is sent to an LSP may include a label associated with each FEC in the LSP between the adjacent upstream LSP and the LSP. Meanwhile, the MPLS echo reply sent by the LSP may include a label associated with each FEC in the LSP between the LSP and an adjacent downstream LSP.

For example, if an LSP contains a path and a single tunnel over that path that exists between two nodes of the LSP, there may be two FECs associated with the two paths by which a packet may transit between the two nodes: via the pass or via the tunnel. However, after the end point of the tunnel, there may only be a single FEC associated with a single path remaining for transiting between the end point of the tunnel and a node downstream to the end point of the tunnel. In this case, if an LSP is an egress node for the tunnel, the LSP may receive an MPLS echo request that includes two labels—one label for each of the two FECs, but the LSP may send an MPLS echo reply that includes only one label—for the single FEC remaining after the end point of the tunnel. In this way, an LSP may compare the number of labels in the MPLS echo request and the number of labels in the MPLS echo reply to determine whether the number of labels towards next-hop is decreasing to determine whether LSP is an egress node for the tunnel.

However, the technique described in RFC 6242 may not be usable to determine whether the LSR is an egress node for a tunnel in the LSP that has its details hidden by Nil FEC when nodes of the LSP perform Penultimate Hop Popping (PHP). To perform PHP, a penultimate hop (i.e., an adjacent upstream LSR) to the egress of a tunnel may remove the label associated with the FEC being traced. As a result of performing PHP, the number of labels in the MPLS echo request received by a LSR that is the egress node of a tunnel may be the same as the number of labels in the MPLS echo reply. As such, the number of labels towards next-hop may not be decreasing even at an LSP that is the egress node of a tunnel when PHP is performed.

In accordance with aspects of the present disclosure, a LSR may be able to determine whether the LSR is an egress node for a tunnel in the LSP that has its details hidden by Nil FEC when nodes of the LSP perform PHP. In particular, a LSR may determine whether an MPLS echo request received by the LSR includes a null label, such as an implicit null label or an explicit null label, that indicates that an adjacent downstream LSR has performed PHP to remove a label associated with the FEC being traced. If the LSP determines that the MPLS echo request includes a null label, the LSP may determine that it is an egress node for the tunnel.

In one example, the disclosure is directed to a method. The method includes receiving, by a label switch router (LSR) in a label-switched path (LSP) from an ingress edge LSR, a Multi-Protocol Label Switching (MPLS) echo request, wherein the LSP includes a tunnel hidden by a Nil Forward Equivalency Class (FEC). The method further includes determining, by the LSR, whether the LSR is an egress node for the tunnel in the LSP based at least in part on one or more labels in the MPLS echo request. The method further includes in response to determining that the LSR is the egress node for the tunnel in the LSP, sending, by the LSR to the ingress edge LSR, an MPLS echo reply that indicates the LSR as being the egress node for the tunnel in the LSP.

In another example, the disclosure is directed to a label switch router (LSR). The LSR includes one or more interfaces configured to receive, from an ingress edge LSR, a Multi-Protocol Label Switching (MPLS) echo request, wherein the LSP includes a tunnel hidden by a Nil Forward Equivalency Class (FEC). The LSR further includes a control unit in communication with the one or more interfaces, the control unit comprising one or more processors configured to determine whether the LSR is an egress node for the tunnel in the LSP based at least in part on one or more labels in the MPLS echo request. The one or more interfaces are configured, in response to determining that the LSR is the egress node for the tunnel in the LSP, to send, to the ingress edge LSR, an MPLS echo reply that indicates the LSR as being the egress node for the tunnel in the LSP.

In another example, the disclosure is directed to a computer-readable storage medium comprising instructions that, when executed by a processor of a label switch router (LSR) in a label-switched path (LSP), cause the processor to: receive, from an ingress edge LSR, a Multi-Protocol Label Switching (MPLS) echo request, wherein the LSP includes a tunnel hidden by a Nil Forward Equivalency Class (FEC); determine whether the LSR is an egress node for the tunnel in the LSP based at least in part on one or more labels in the MPLS echo request; and in response to determining that the LSR is the egress node for the tunnel in the LSP, send an MPLS echo reply that indicates the LSR as being the egress node for the tunnel in the LSP.

In another example, the disclosure is directed to a method. The method includes sending, by an ingress edge label switch router (LSR) of a label-switched path (LSP) to a first LSR of the LSP, a first Multi-Protocol Label Switching (MPLS) echo request, wherein the LSP includes a tunnel hidden by a Nil Forward Equivalency Class (FEC). The method further includes receiving, by the ingress edge LSR from the first LSR, a first MPLS echo reply indicative of the first LSR having performed Penultimate Hop Popping (PHP). The method further includes sending, by the ingress edge LSR to a second LSR of the LSP, the second LSR being an adjacent downstream node to the first LSR in the LSP, a second MPLS echo request. The method further includes receiving, by the ingress edge LSR from the second LSR, a second MPLS echo reply indicative of the second LSR as being an egress node for the tunnel in the LSP.

The details of one or more techniques of the disclosure are set forth in the accompanying drawings and the description below. Other features, objects, and advantages of the techniques will be apparent from the description and drawings, and from the claims.

BRIEF DESCRIPTION OF THE DRAWINGS

FIG. 3 illustrates a data structure of an object 300 that may be included in a request or a reply to perform MPLS traceroute for an LSP.

FIG. 4 illustrates exemplary request and reply messages.

FIG. 5 illustrates a data structure of an exemplary object that may be used as a request object or reply object in FIG. 4.

DETAILED DESCRIPTION

Figure 1A:
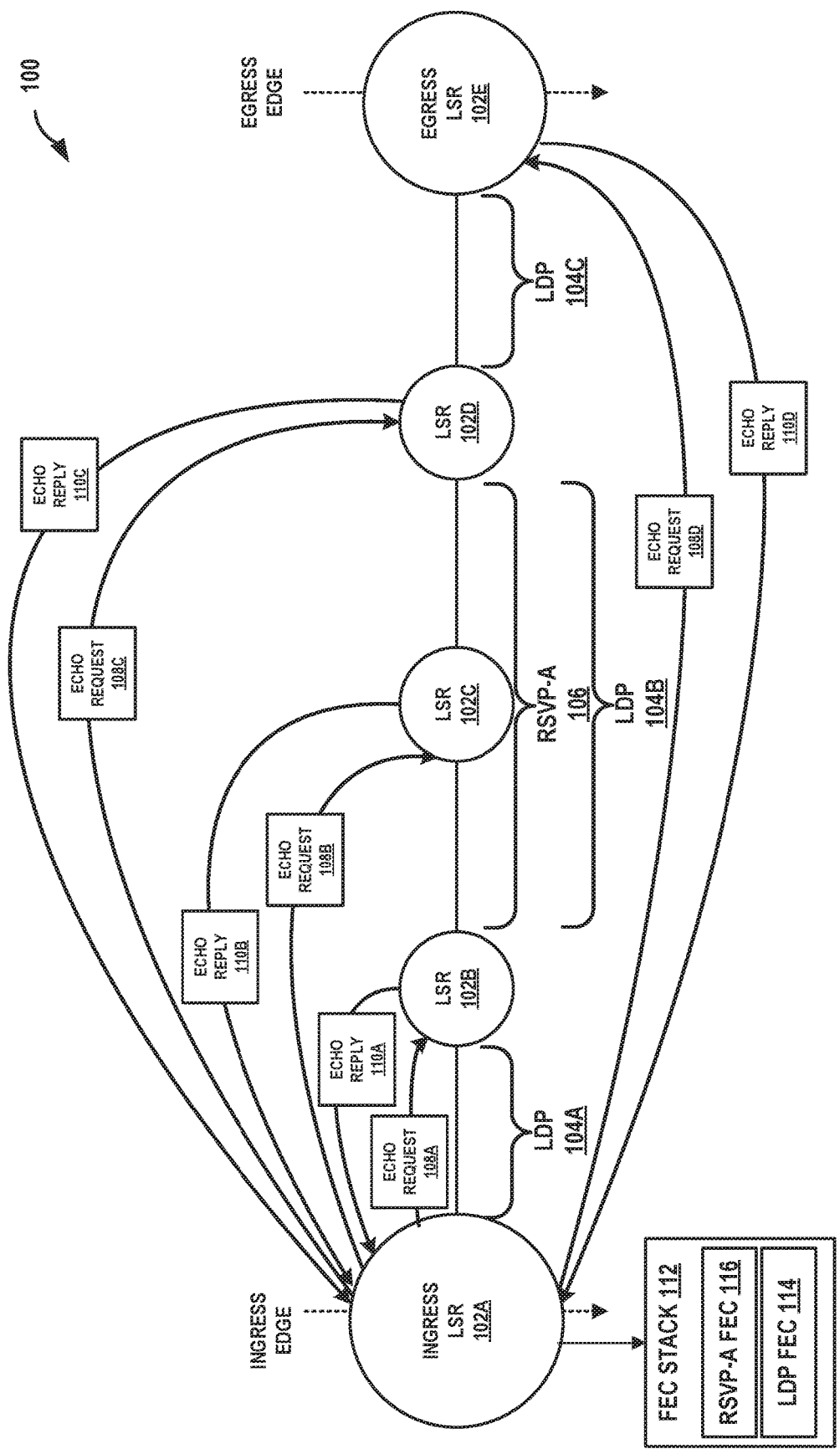
FIGS. 1A-1C illustrate an example MPLS Label-Switched Path (LSP) according to aspects of the present disclosure.
Figure 1B:
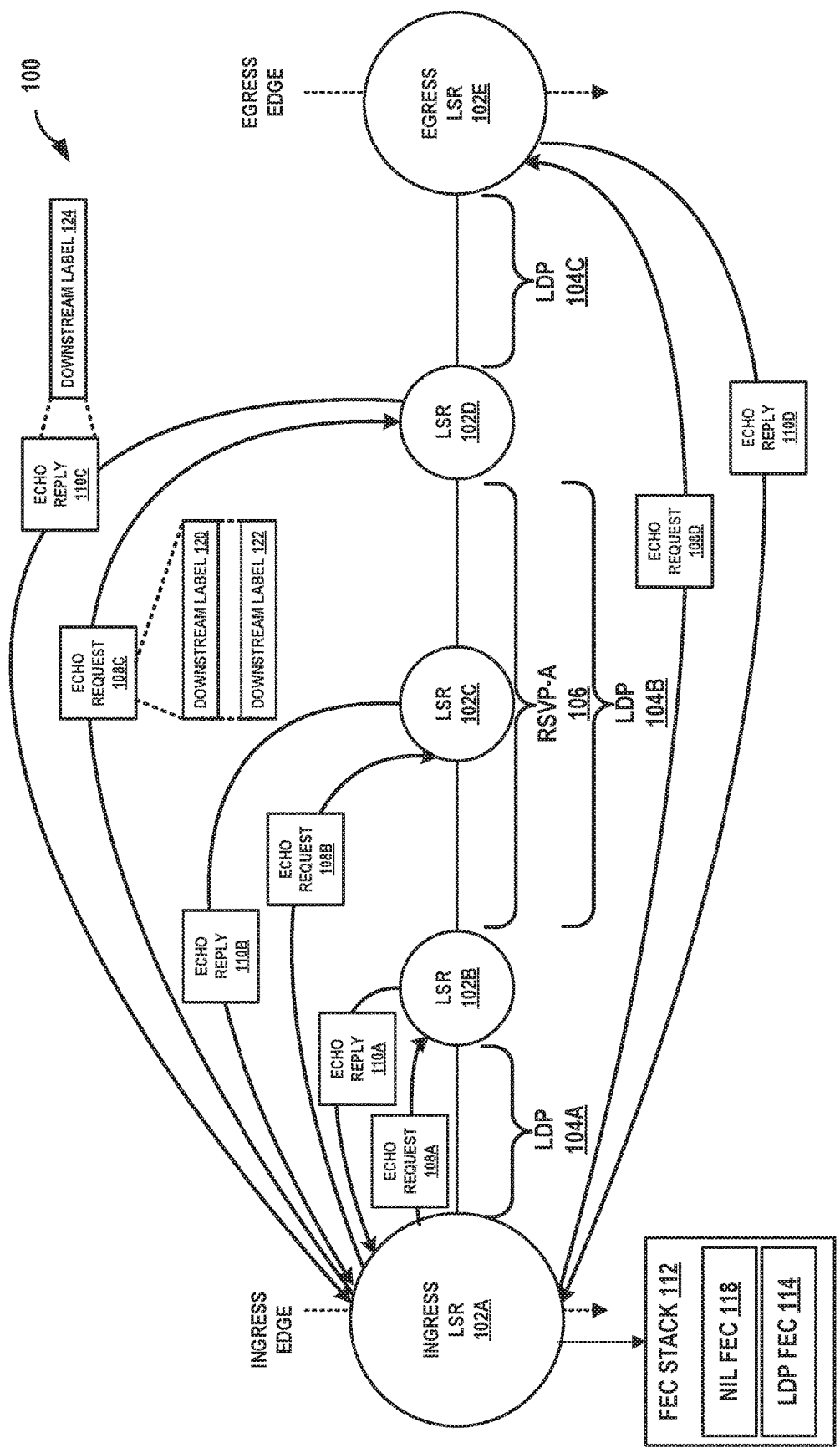
Figure 1C:
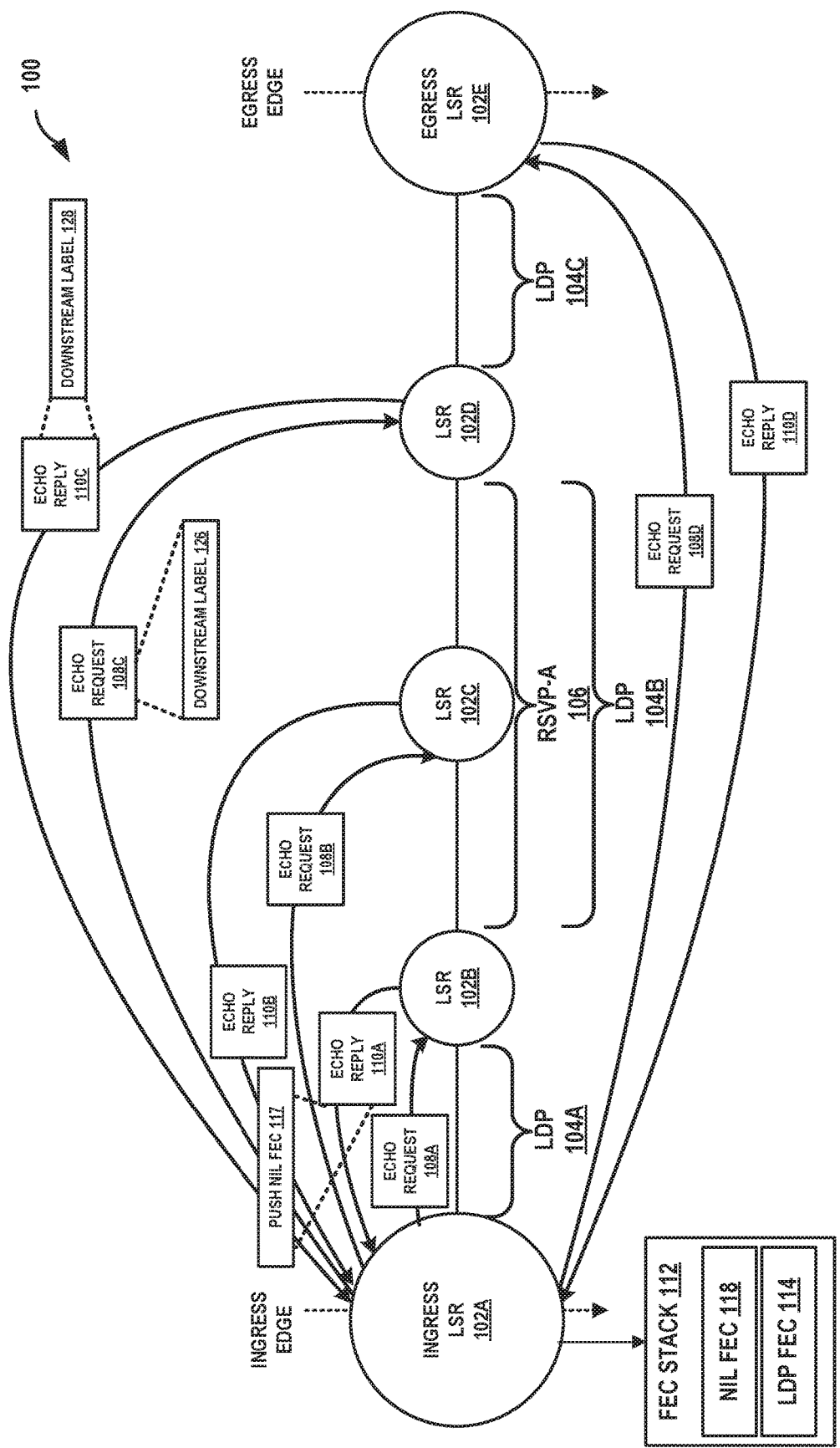

FIGS. 1A-1C illustrate an example MPLS Label-Switched Path (LSP) according to aspects of the present disclosure. As shown in FIG. 1A, LSP 100 is an end-to-end Label Distribution Protocol (LDP) LSP with LDPs 104A-104C from ingress edge Label Switching Router (LSR) 102A at an ingress edge of LSP 100 through LSRs 102B-102D to egress edge LSR 102E that is at an egress edge of LSP 100. Ingress edge LSR 102A and egress edge LSR 102E may also be referred to as a Label Edge Router (LER) or an edge LSR as they are situated at the edges of LSP 100. Further, LSP 100 includes a Resource Reservation Protocol (RSVP) tunnel in the form of RSVP-A 106 from LSR 102B to LSR 102D. Because LSP 100 is an end-to-end LDP LSP, LSP 100 can be considered as having an LDP tunnel. Further, because LSP also includes RSVP-A 106 from LSR 102B to LSR 102D, RSVP-A 106 can be considered to be a hierarchical tunnel over the LDP tunnel from LSR 102B to LSR 102D.

In a traceroute mode, the ingress edge LSR 102A may identify, for one or more Forward Equivalency Classes (FECs) being traced, a location of a fault in LSP 100 by tracing an MPLS echo request packet's path from the ingress edge LSR 102A to the egress edge LSR 102E. As output, the traceroute typically shows how many hops the packet traveled to reach the egress edge LSR 102E, identifies each hop, and shows how long each hop took.

Ingress edge LSR 102A may send MPLS echo requests 108A-108D to LSRs 102B-102E in order to perform the traceroute and may, in response, receive MPLS echo replies 110A-110D from LSRs 102B-102E. For example, LSR 102A may send MPLS echo request 108A to LSR 102B and may, in response, receive MPLS echo reply 110A from LSR 102B. LSR 102A may send MPLS echo request 108B to LSR 102C and may, in response, receive MPLS echo reply 110B from LSR 102C. LSR 102A may send MPLS echo request 108B to LSR 102C and may, in response, receive MPLS echo reply 110B from LSR 102C. LSR 102A may send MPLS echo request 108C to LSR 102D and may, in response, receive MPLS echo reply 110C from LSR 102E. LSR 102A may complete the traceroute by sending MPLS echo request 108D to LSR 102E and may, in response, receive MPLS echo reply 110D from LSR 102E. When LSR 102A receives MPLS echo reply 110D from LSR 102E, LSR 102A may end the traceroute.

When an LSR (one of LSRs 102B-102E) receives an MPLS echo request, the receiving LSR may verify whether the control plane and data plane are both healthy and whether the two planes are in sync. In response, the receiver sends an MPLS echo reply back to the ingress edge LSR 102A indicating that the control plane and the data plane of the echo request are in sync, or an error message indicating that the control plane and the data plane of the echo request are not in sync.

Ingress edge LSR 102A may keep track of the FEC being validated during the traceroute via use of FEC stack 112. For example, because LSP 100 is an end-to-end LDP LSP, FEC stack 112 may include LDP FEC 114 to indicate that LDP is the FEC currently being traced by ingress edge LSR 102A. LSR 102B is the start of a tunnel represented by RSCP-A 106 in LSP 100. Thus, when ingress edge LSR 102A sends MPLS echo request 108A to LSR 102B, LSR 102B may, in response to receiving echo request 108A, responds with echo reply 110A that includes a PUSH operation for an RSVP-A FEC to an push RSVP-A FEC on top of FEC stack 112. Thus, in response to receiving echo reply 110A from LSR 102B, ingress edge LSR 102A may push RSVP-A FEC 116 on FEC stack 112 so that RSVP-A FEC 116 is on top of LDP FEC 114, thereby indicating that RSVP-A FEC 116 is currently being traced.

RSVP-A FEC 116 may contain information regarding tunnel RSVP-A 106, such as the identity of the egress node of tunnel RSVP-A 106. Ingress edge LSR 102A may use the information contained in FEC stack 112 to formula MPLS echo requests for downstream nodes of LSP 100. For example, LSP 100 may use information contained in RSVP-A FEC 116 in FEC stack 112 to include an indication of the end point (e.g., egress ode) of tunnel RSVP-A 106 in MPLS echo requests for downstream nodes of LSP 100. Thus, ingress edge LSR 102A may send MPLS echo request 108C to LSR 102D that indicates LSR 102D is the egress node for tunnel RSVP-A 106.

LSR 102D may, in response to receiving MPLS echo request 108C, send MPLS echo reply 110C to ingress edge LSR 102A that indicates LSR 102D is the egress node for tunnel RSVP-A 106. For example, LSR 102D may formulate MPLS echo reply 110C that includes a POP operation for RSVP-A FEC 116 to remove RSVP-A FEC 116 from FEC stack 112. Ingress edge LSR 102A may receive echo reply 110C and may, in response, remove RSVP-A FEC 116 from FEC stack 112, thereby changing the FEC being traced from RSVP-A FEC 116 back to LDP FEC 114.

In some examples, a node, such as one or more of LSRs 102A-102E, may use Nil FEC to skip FEC validation and to hide the details of the node's tunnel from the ingress edge LSR (e.g., LSR 102A) that sent the MPLS echo request. In particular, a node may use Nil FEC to refrain from sending details about a new tunnel FEC to the ingress edge LSR. When a node uses Nil FEC to hide the details of a tunnel starting at the node, the node may send an MPLS echo reply that contains a PUSH operation with Nil FEC, where the Nil FEC does not include information regarding the identity of the egress node of the tunnel.

As shown in FIG. 1B, if LSR 102B uses Nil FEC to hide the details of tunnel RSVP-A 106 from ingress edge LSR 102A, LSR 102B may include in MPLS echo reply 110A PUSH operation with Nil FEC 117, and ingress edge LSR 102A may, in response to receiving MPLS echo reply 110A, push Nil FEC 118 on to FEC stack 112 so that FEC stack 112 includes a Nil FEC 118, and not RSVP-A FEC 116, at the top of the stack and LDP FEC 114 at the bottom of the stack.

Because the Nil FEC does not include information regarding the associated tunnel (e.g., tunnel RSVP-A 106), ingress edge LSR 102A may not be able to include information such as the end point of tunnel RSVP-A 106 in MPLS echo requests that it formulates and sends to downstream nodes of LSP 100. Thus, MPLS echo request 108C sent by ingress edge LSR 102A to LSR 102D may not include information regarding the end point of tunnel RSVP-A 106 that LSR 102D may use to determine whether LSR 102D is an egress node of tunnel RSVP-A 106.

Instead, an LSR may determine whether it is an egress node of a tunnel associated with Nil FEC 118 by determining if the number of labels towards next-hop is decreasing, as described further with respect to FIG. 1B. In the example of FIG. 1B, LSR 102D may receive echo request 180C with two downstream labels: downstream label 120 and downstream label 122 that correspond to the two FECs in FEC stack 112: Nil FEC 118 and LDC FEC 114. However, LSR 102D may only include a single downstream label—downstream label 124 in its MPLS echo reply 110C to correspond to LDP FEC 114 because ingress edge LSR 102A may stop tracing Nil FEC 118 after LSR 102D.

Thus, LSR 102D may determine that the number of labels towards next-hop is decreasing because while it receives two downstream labels 120 and 122 in MPLS echo request 108C, it may include only one downstream label 124 in MPLS echo reply 110C. As such, LSR 102D may determine that LSR 102D is an egress node for the tunnel associated with nil FEC 118.

However, in some examples, an LSR may not be able to determine whether it is an egress node of a tunnel having its details hidden using Nil FEC by determining if the number of labels towards next-hop is decreasing. As shown in FIG. 1C, LSR 102B uses Nil FEC to hide the details of tunnel RSVP-A 106 from ingress edge LSR 102A by including in MPLS echo reply 110A PUSH operation with Nil FEC 117, and ingress edge LSR 102A may, in response to receiving MPLS echo reply 110A, push Nil FEC 118 on to FEC stack 112 so that FEC stack 112 includes Nil FEC 118 at the top of FEC stack 112 and LDP FEC 114 at the bottom of FEC stack 112.

LSRs 102A-102E in FIG. 1C may perform Penultimate Hop Popping (PHP) in which an LSR that is a penultimate node to the egress node of a tunnel may remove the downstream label of the egress node for the FEC currently being traced. Thus, for example, because LSR 102C is a penultimate node to LSR 102D that is the egress node of the tunnel associated with Nil FEC 118, LSR 102C may perform PHP to remove the downstream label for LSR 102D that is associated with Nil FEC 118 being traced. Thus, instead of receiving MPLS echo request 108C that includes two downstream labels, LSR 102D may instead receive MPLS echo request 108C that only includes a single downstream label—downstream label 126 associated with LDP FEC 114. Meanwhile, LSR 102D may only include a single downstream label—downstream label 128 in its MPLS echo reply 110C associated with LDP FEC 114.

As such, because LSR 102D receives MPLS echo request 108C that includes a single downstream label and because LSR 102D generates MPLS echo reply 110C that includes a single label, the number of labels towards next-hop stays the same at LSR 102D. Therefore, LSR 102D may not be able to determine whether it is an egress node for the tunnel hidden via Nil FEC by determining if the number of labels towards next-hop is decreasing.

In accordance with aspects of the present disclosure, a LSR, such as LSR 102D, in a LSP, such as LSP 100, may receive from an ingress edge LSR, such as ingress edge LSR 102A, a MPLS echo request, such as MPLS echo request 108C associated with a FEC, where the LSP includes a tunnel, such as RSVP-A 106 having details that are hidden by a Nil FEC. The LSR may be able to determine whether the LSR is an egress node for the tunnel in the LSP based at least in part on one or more labels in the MPLS echo request, such MPLS echo request 108C. In some aspects of the present disclosure, the LSR may determine whether it is an egress node for a tunnel in the LSP even when LSRs of the LSP performs techniques such as Penultimate Hop Popping. The LSR may, in response to determining that the LSR is the egress node for the tunnel in the LSP, send, to the ingress edge LSR, an MPLS echo reply, such as MPLS echo reply 110C, that indicates the LSR as being the egress node for the tunnel in the LSP.

The techniques described in the present disclosure solve the technical problem in MPLS of determining, for a tunnel having its details hidden via Nil FEC in an LSP, information such as the egress node of the tunnel in the LSP even while the LSP perform techniques such as Penultimate Hop Popping. As such, the techniques described in the present disclosure provide a technical solution to a technical problem.

Figure 2:
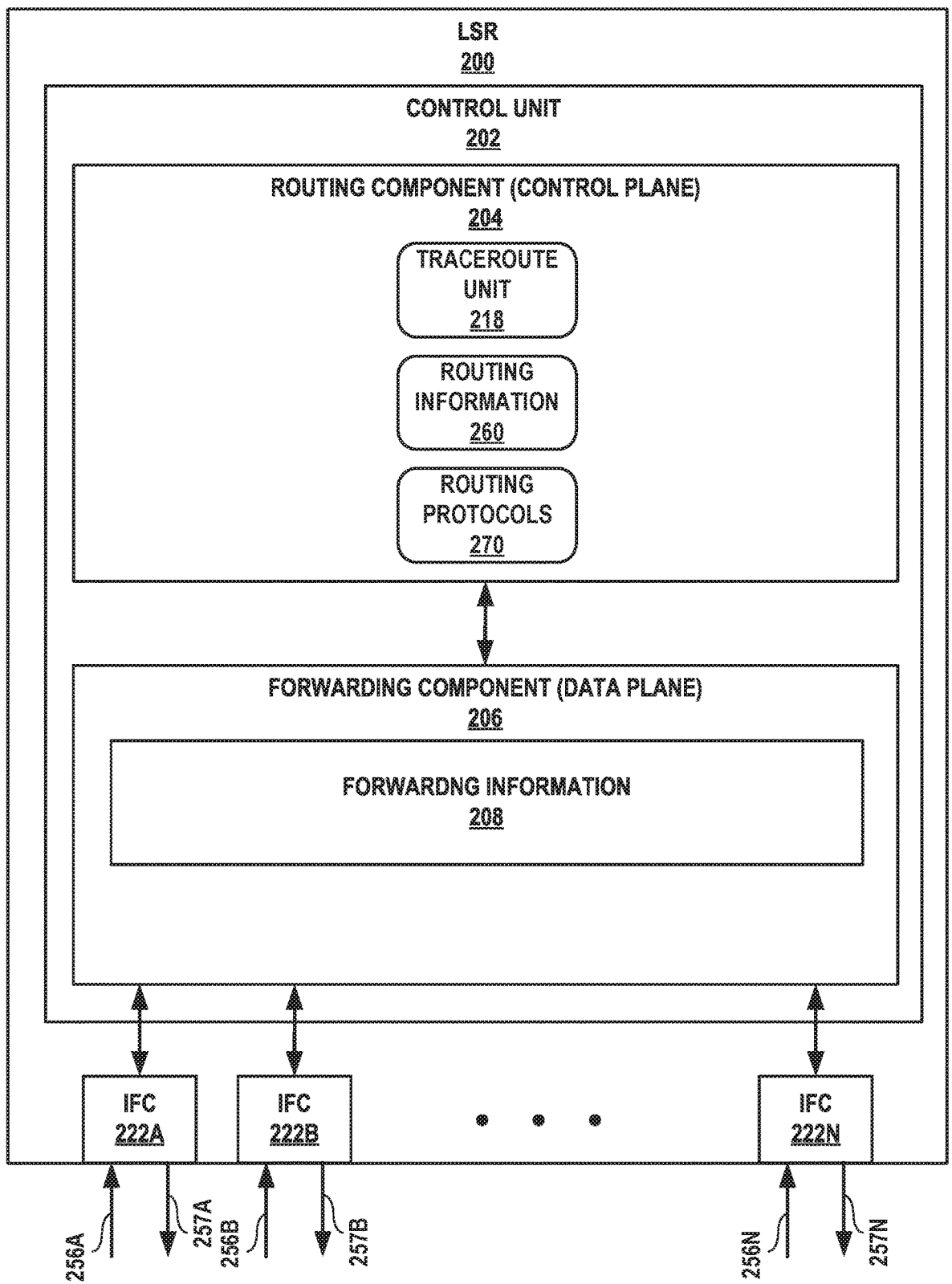
FIG. 2 is a block diagram illustrating an example Label Switching Router (LSR), according to aspects of the present disclosure.

FIG. 2 is a block diagram illustrating an example Label Switching Router (LSR), in accordance with techniques of the present disclosure. While described with respect to LSR 200, the techniques may be implemented by any other type of network device capable of implementing segment routing. Thus, while described with respect to LSR 200, the techniques should not be limited to LSR 200 described with respect to the example of FIG. 2.

In the example of FIG. 2, LSR 200 may represent any LSR described in this disclosure, such as any of LSRs 102A-102E of FIG. 1. As shown in FIG. 2, LSR 200 includes control unit 202 that includes routing component 204 and forwarding component 206. LSR 200 further includes interface cards 222A-222N ("IFCs 222") that receive and send data units, such as packet flows, via network links 256A-256N and 257A-257N, respectively. LSR 200 may include a chassis (not shown) having a number of slots for receiving a set of cards, including IFCs 222. Each card may be inserted into a corresponding slot of the chassis for electrically coupling the card to routing component 204 via high-speed switch (not shown), which may comprise, for example, switch fabric, switchgear, a configurable network switch or hub, or other high-speed switching mechanisms. IFCs 222 may be coupled to network links 256A-256N and 257A-257N via a number of physical interface ports (not shown). Generally, IFCs 222 may each represent one or more network interfaces by which LSR 200 may interface with links of a network.

Routing component 204 provides an operating environment for various routing protocols 270 that execute at different layers of a network stack. Examples of routing protocols 270 may include LDP, RSVP-, BGP, and the like. Routing component 204 is responsible for the maintenance of routing information 260 to reflect the current topology of a network and other network entities to which LSR 200 is connected. In particular, routing protocols 270 may periodically update routing information 260 to accurately reflect the topology of the network and other entities based on routing protocol messages received by LSR 200. The protocols may be software processes executing on one or more processors. For example, routing component 204 includes network protocols that operate at a network layer of the network stack, which are typically implemented as executable software instructions.

Routing component 204 may include traceroute unit 218 that executes on one or more processors in the control plane (e.g., routing component 204) of LSR 200. When LSR 200 receives an MPLS echo request, such as via IFCs 222, traceroute unit 218 may execute to perform FEC validation to verify whether the control plane (e.g., routing component 204) and the data plane (e.g., forwarding component 206) are both healthy for the FEC Stack being pinged and whether the two planes are in sync. In response, traceroute unit 218 may execute to send, via IFCs 222, an MPLS echo reply indicating that the control plane and the data plane are in sync, or an error message indicating that the control plane and the data plane of the echo request are not in sync.

Traceroute unit 218 may execute to determine if LSR 200 is the originating point (i.e., ingress node) of one or more new tunnels in the LSP. If so, traceroute unit 218 may execute to include, in the MPLS echo reply, indications of the one or more new tunnels originating at LSR 200. The indications of the one or more new tunnels may include indications of a FEC stack change along with the new FEC details for each of the one or more tunnels originating at LSR 200. In some examples, traceroute unit 218 may hide the details of one or more tunnels originating at LSR 200 via Nil FEC by executing to include an indication of a FEC stack change and an indication of a Nil FEC for each tunnel hidden by traceroute unit 218.

In some examples, traceroute unit 218 may execute to determine if LSR 200 is the end point (i.e., egress node) of one or more tunnels in the LSP. If traceroute unit 218 determines that LSR 200 is an end point of one or more tunnels in the LSP, traceroute unit 218 may execute to include, in the MPLS reply, indications of one or more tunnels in the LSP for which LSR 200 is the end point.

In accordance with aspects of the present disclosure, traceroute unit 218 may execute to determine whether LSR 200 is the end point for a tunnel that is hidden via Nil FEC based at least in part on one or more labels in the MPLS echo request. In some examples, traceroute unit 218 may execute to determine if the one or more labels in the MPLS echo request indicate that an adjacent upstream node to LSR 200 in the LSP has performed penultimate hop popping (PHP) to remove a downstream label associated with LSR 200 for the Nil FEC in the LSP. If traceroute unit 218 determines that the one or more labels in the MPLS echo request indicate that an adjacent upstream node to LSR 200 in the LSP has performed PHP to remove a downstream label associated with LSR 200 for the FEC in the LSP, traceroute unit 218 may execute to determine that it is the end point for the tunnel that is hidden via Nil FEC.

In some examples, traceroute unit 218 may execute to determine whether LSR 200 is the end point for a tunnel that is hidden via Nil FEC based on determining whether the MPLS echo reply includes an egress label advertised by the LSR. If traceroute unit 218 determines that the MPLS echo reply includes an egress label advertised by the LSR, traceroute unit 218 may determine that LSR 200 is the end point for a tunnel that is hidden via Nil FEC.

When traceroute unit 218 determines that LSR 200 is the end point for a tunnel that is hidden via Nil FEC, traceroute unit 218 may execute to include, in the MPLS echo reply, an indication that LSR 200 is the end point for the tunnel that is hidden via Nil FEC. For example, traceroute unit 218 may execute to include a return code indicative of LSR 200 being the egress for the Nil FEC. In some examples, alternatively or in addition, trace unit 218 may include an indication of a FEC stack change to remove the Nil FEC from the FEC stack.

Forwarding component 206 stores forwarding information 208 that includes destinations of output links 257. Forwarding information 208 may be generated in accordance with routing information 260.

Although described for purposes of example with respect to a router, LSR 200 may be more generally a network device having routing functionality, and need not necessarily be a dedicated routing device. The architecture of LSR 200 illustrated in FIG. 2 is shown for example purposes only. The techniques of this disclosure are not limited to this architecture. In other examples, LSR 200 may be configured in a variety of ways. In one example, some of the functionally of control unit 202 may be distributed within IFCs 222. In another example, control unit 202 may comprise a plurality of packet forwarding engines operated as slave routers.

Control unit 202 may be implemented solely in software, or hardware, or may be implemented as a combination of software, hardware, or firmware. For example, control unit 202 may include one or more processors that execute program code in the form of software instructions. In that case, the various software components/modules of control unit 202 may comprise executable instructions stored on a computer-readable storage medium, such as computer memory or hard disk.

FIG. 3 illustrates a data structure of an object 300 that may be included in a request or a reply to perform MPLS traceroute for an LSP. In some examples, object 300 may be included in an MPLS echo request or an MPLS echo reply described throughout this disclosure, such as MPLS echo requests 108A-D and MPLS echo replies 110A-D in FIG. 1. Object 300 may include request identifier 310 and identifier 320 of the LSP (or FEC) being tested. Request identifier 310 may be used to match a received reply to a previously sent request, and should therefore be able to identify uniquely, at least locally at a given ingress edge LSR or some other node that initiated the test, a request. Accordingly, request identifier 310 may include one or more of: (i) an identifier of a process used to generate the request (and a sequence number or time stamp if a given process generates multiple requests); (ii) a time stamp; and (iii) an ingress edge LSR global identifier (e.g., a layer 3 address). Identifier 320 may identify the LSP or FEC being tested may be a FEC stack. The FEC stack may include, for example, an LDP Internet Protocol (IP) (e.g., version 4 or 6) prefix, an RSVP IP (e.g., version 4 or 6) session, a VPN IP (e.g., version 4 or 6) prefix, Nil FEC, and the like.

As shown, object 300 may include additional information, such as a test mode 330, a return mode 340, and information 350 concerning a replying node. Test mode 330 may be carried in the object of the request and may specify one of a number of tests (e.g., connectivity or fault isolation) to be performed. Return mode 340 may be carried in the object of the request and may specify how the reply is to be returned to the ingress edge LSR or some other node that initiated the test. That is, return mode 340 may be used to specify a return channel such as routed path, routed path with router alert, control plane, etc., presumed to be reliable. Finally, information 350 concerning the replying node may be carried in an object of the reply and may be used to relay information about the node that generated the reply in response to the request.

FIG. 4 illustrates exemplary request and reply messages. In some examples, a request message may be an MPLS echo request, such as MPLS echo requests 108A-D in FIGS. 1A-1C, and a reply message may be an MPLS echo reply described throughout this disclosure, such as MPLS echo replies 110A-D in FIGS. 1A-1C. As shown in FIG. 4, request message 410 may include request object 416, which may be an example of object 300 of FIG. 3, network and transport layer protocol information 414, such as an UDP header and an IP header, and label 412 that includes information for identifying a FEC. Label 412 may be used for forwarding information 414 and request object 416 over an LSP being tested. Reply message 420 may include reply object 424, such as object 300 of FIG. 3, and network and transport layer protocol information 422, such as an UDP header and an IP header, and the like.

FIG. 5 illustrates a data structure of an exemplary object 500 that may be used as a request object 416 or reply object 424 in FIG. 4 in a manner consistent with principles of the invention. For example, object 500 may be an MPLS echo request or an MPLS echo reply.

As shown in FIG. 5, object 500 may include sequence number field 510 for carrying a sequence number, version number field 512 for carrying a version number, global flags field 514 for carrying one or more global flags, message type field 516 for carrying a sender's handle, timestamp fields 520, 522, 530, and 532 for carrying time stamps in seconds, and microseconds, reply mode field 540 for carrying a reply mode, return code field 560 for carrying a return code, and one or more Type-Length-Values (TLVs) 580.

The version number carried in version number field 512 may be set according to the version of the protocol being used. For example, initially, the version number of field 512 may be set to "1." The version number may be changed, e.g. incremented, when a change occurs that affects the ability of an implementation to correctly parse or process an MPLS echo request or an MPLS echo reply. Such changes may include, for example, syntactic or semantic changes made to any of the fixed fields, or to any TLV, such as one or more TLVs 580, or a sub-TLV assignment or format that is defined at a certain version number. For Example, the version number may change in response to an optional TLV or sub-TLV addition.

Flag bits of the global flags carried in global flags field 514 may be added or updated according to modifications to the protocol. Global flags field 514 may be sixteen bits long such that, for example, each bit corresponds to one flag. For example, the sixteenth bit of global flags field 514 may be defined as a validate FEC stack flag (V flag). In one example, when the sender, such as the sender of an MPLS echo request, wants the receiver to perform FEC stack validation, the sender may set the V flag to "1," whereas when the sender wants to leave the choice of whether to perform FEC stack validation to the receiver, the sender may set the V flag to "0." In one example, undefined flags may be set to zero by the sender and ignored by the receiver.

The message type value carried in message type field 516 may indicate the type of message carried by object 500. For example, the message type value of message type field 516 may be one of the following values:

| Value | Meaning |
|---|---|
| 1 | MPLS echo request |
| 2 | MPLS echo reply |

The sender's handle value in sender's handle field 518 may indicate the sender of object 500. An echo reply packet may return an echo reply with the sender's handle value in sender's handle field 518 unchanged. In one example, a sender may use field 518 to match requests with replies. The sequence number carried in sequence number field 510 may be assigned by the originator of the request. The sequence number serves to help match a reply to a request and can therefore be used, for example, to detect missed replies.

The timestamp included in timestamp fields 520 and 530 may be set to the time of day in seconds and microseconds, respectively, when an MPLS echo request is sent. Likewise, the timestamp included in timestamp fields 522 and 532 may be set to the time of day in seconds and microseconds, respectively, when an echo reply corresponding to the echo request is received. The timestamp included in timestamp fields 522 and 532 may be set according to the receiver's clock. The timestamp may be used, for example, to compute delay or round trip time, to help match a reply to a request, or both. Timestamps in any or all of timestamp fields 520, 522, 530, and 532 may be formatted according to the Network Time Protocol (NTP) format.

The reply mode carried in reply mode field 540 may be used to specify a type of a presumed reliable return path. The reply mode may, in some examples, be one of the following values:

| Value | Meaning |
|---|---|
| 1 | Do not reply |
| 2 | Reply via an IPv4/IPv6 UDP packet |
| 3 | Reply via an IPv4/IPv6 UDP packet with Router Alert |
| 4 | Reply via application level control channel |

In some examples, an LSR that receives an MPLS echo request may set the return code value of return code field 560 in an MPLS echo reply to one of the following values:

| Value | Meaning |
|---|---|
| 0 | No return code |
| 1 | Malformed echo request received |
| 2 | One or more of the TLVs was not understood |
| 3 | Replying router is an egress for the FEC at stack-depth <RSC> |
| 4 | Replying router has no mapping for the FEC at stack-depth <RSC> |
| 5 | Downstream mapping mismatch |
| 6 | Upstream interface index unknown |
| 7 | Reserved |
| 8 | Label switched at stack-depth <RSC> |
| 9 | Label switched, no MPLS forwarding at stack-depth <RSC> |
| 10 | Mapping for this FEC is not the given label at stack-depth <RSC> |
| 11 | No label entry at stack-depth <RSC> |
| 12 | Protocol not associated with interface at FEC stack-depth <RSC> |
| 13 | Premature termination of ping due to label stack shrinking to a single label |
| 14 | See DDMAP TLV for meaning of Return Code and Return Subcode |
| 15 | Label switched with FEC change |

In the above example of return codes, the notation <RSC> indicates that the return code may also have indicated a return subcode in return subcode field 562. The return subcode of field 562 may be filled in with the stack-depth for those codes that specify a stack-depth, e.g. values 3, 4, 8, 9, 10, 11, and 12 of return code field 560. Moreover, the return subcode of field 562 may contain the point in the label stack where processing was terminated. For example, when the return subcode of return subcode field 562 is "0," a router may determine that no labels were processed. Otherwise, the packet may have been label switched at a depth corresponding to the value of return subcode field 562. For example, if the value of return subcode field 562 is "6," a router may determine that six labels were processed. Further, the return code of return code field 560 may be set to "14" in an MPLS echo reply to indicate that each Downstream Detailed Mapping TLV has an appropriate return code and return subcode.

Each TLV in TLVs 580 may include type field 582, length field 584, and value field 586. Some example types, with respect to top-level TLVs for LSP ping, are listed below:

| Type # | Value Field |
|---|---|
| 1 | Target FEC Stack |
| 2 | Downstream Mapping (Deprecated) |
| 3 | Pad |
| 4 | Not assigned |
| 5 | Vendor Enterprise Number |
| 6 | Not assigned |
| 7 | Interface and Label Stack |
| 8 | Not assigned |
| 9 | Errored TLVs |
| 10 | Reply TOS byte |
| 20 | Downstream Detailed Mapping |

The value of length field 584 may be the length of value field 586. The value of value field 586 may depend on the type and may be zero padded to align to a four-octet boundary. As can be seen, each object 500 may include one or more of the TLVs listed above. For example, an MPLS echo request may include a target FEC stack TLV as well as a Downstream Detailed Mapping (DDMAP) TLV.

In some examples, TLVs may be nested within other TLVs; a nested TLV may be referred to as a "sub-TLV." Example target FEC stack TLVs and DDMAP TLVs are described below. In one example, a target FEC stack is a list of sub-TLVs. The number of elements is determined by looking at the sub-TLV length fields. Target FEC stack sub-TLVs may include the following:

| Type # | Length | Value Field |
|---|---|---|
| 1 | 5 | LDP IPv4 prefix |
| 2 | 17 | LDP IPv6 prefix |
| 3 | 16 | RSVP IPv4 LSP |
| 4 | 52 | RSVP IPv6 LSP |
| 5 | | Not assigned |
| 6 | 13 | VPN IPv4 prefix |
| 7 | 25 | VPN IPv4 prefix |
| 8 | 14 | L2 VPN endpoint |

| Type # | Length | Value Field |
| --- | --- | --- |
| 9 | 10 | "FEC 128" Pseudowire (deprecated) |
| 10 | 14 | "FEC 128" Pseudowire |
| 11 | 16+ | "FEC 129" Pseudowire |
| 12 | 5 | BGP labeled IPv4 prefix |
| 13 | 17 | BGP labeled IPv6 prefix |
| 14 | 5 | Generic IPv4 prefix |
| 15 | 17 | Generic IPv6 prefix |
| 16 | 4 | Nil FEC |

Other FEC stack types may be defined as needed. Note that this TLV defines a stack of FECs in which the first FEC element corresponds to the top of the label stack, etc. It may be assumed that the stack consists of just one element. Some of the exemplary FEC stack types are now described.

In the example of IPv4 Prefix FEC, the value consists of four octets of an IPv4 prefix followed by one octet of prefix length in bits. The IPv4 prefix is in network byte order. In the exemplary IPv6 Prefix FEC stack type, the value consists of sixteen octets of an IPv6 prefix followed by one octet of prefix length in bits. The IPv6 prefix is in network byte order.

In one example, an MPLS echo may include a target FEC stack that describes the FEC stack being tested. As an example, an LSR "X" may have an LDP mapping for IP address 192.168.1.1. To further the example, the label for 192.168.1.1 may be "1001." To verify that label 1001 reaches an egress edge LSR that announced this prefix via LDP, X may send an MPLS echo request with an FEC stack TLV with one FEC in it, namely of type "1," i.e. LDP IPv4 prefix, with prefix "192.168.1.1/32" and X may send the echo request with a label of "1001."

Nil FEC is one example of a FEC that can be included in target FEC stack. Nil FEC allows a responder node to hide from the sender node a FEC element that it is pushing or stitching to by adding a NIL FEC TLV with a PUSH or a POP&PUSH (equivalent to a SWAP) operation into the FEC stack change sub-TLV, as further described below. For example, an LSR may use Nil FEC to hide the details of a tunnel, such as the details regarding the egress node of the tunnel, that starts at the LSR.

Figure 6:
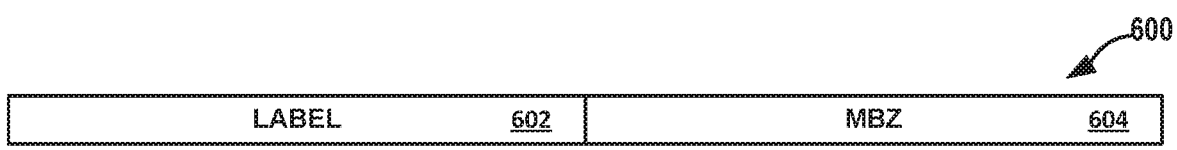
FIG. 6 illustrates the data structure of an exemplary Nil FEC that can be included in a target FEC stack.

FIG. 6 illustrates the data structure of an exemplary Nil FEC that can be included in a target FEC stack. As shown in FIG. 6, Nil FEC 600 includes label field 602 and Must Be Zero (MBZ) field 604. Label field 602 is a 20-bit field that includes a label value that is from the reserved range, such as a label value indicative of Router Alert or explicit-null, while MBZ field 604 has a value of zero.

An MPLS echo request or an MPLS echo reply may include a TLV that is a Downstream Detailed Mapping object, also referred to as a Downstream Detailed Mapping (DDMAP) TLV. If an MPLS echo request includes a DDMAP TLV, the MPLS echo request may only include a single DDMAP TLV. If an LSR is the destination (e.g., Label Edge Router) of the FEC, then the MPLS echo reply sent by the LSR may not include an DDMAP TLV. Otherwise, an LSR may include in an MPLS echo reply a DDMAP TLV for each interface over which the LSR may forward the FEC.

Figure 7:
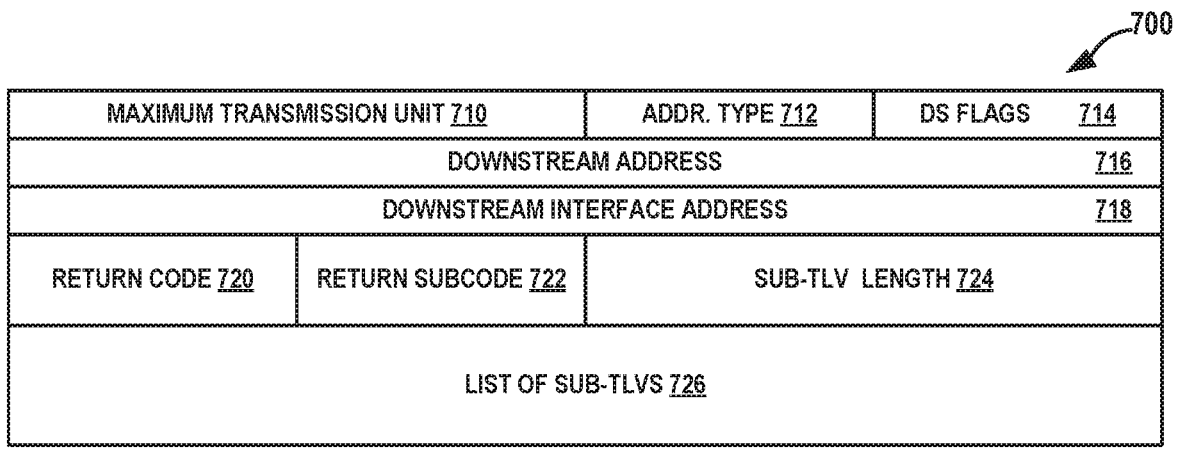
FIG. 7 illustrates the data structure of an exemplary Downstream Detailed Mapping Type-Length-Value (TLV) object.

FIG. 7 illustrates the data structure of an exemplary Downstream Detailed Mapping Type-Length-Value object. As shown in FIG. 7, Downstream Detailed Mapping (DD-MAP) TLV 700 includes maximum transmission unit field 710, address type field 712, downstream (DS) flags field 714, downstream address field 716, downstream interface address field 718, return code field 720, return subcode field 722, sub-TLV length field 724, and list of sub-TLVs field 726.

The value included in maximum transmission unit field 716 indicates the size of the largest MPLS frame (including label stack) that fits on the interface to the downstream LSR. The value included in address type field 712 indicates if the interface is numbered or unnumbered and also determines the length of the downstream address field 712 and the length of the downstream interface address field 718. The value of DS flags field 714 is a bit vector of various flags, such as to indicate an interface and label stack object request.

The value of downstream address field 716 is the IP address of the downstream LSR. The value of the downstream interface address field 718 is the downstream interface address of the downstream LSR. The values of return code field 720 and return subcode field 722 are ignored unless the value of return code field 560 show in FIG. 5 is set to "14" corresponding to "see DDMAP TLV for meaning of Return Code and Return Subcode." The value of sub-TLV length field 724 is the total length of the sub-TLVs in list of sub-TLVs field 726.

The list of sub-TLVs field 726 of DDMAP TLV 700 may include one or more of the following sub-TLVs:

| Sub-Type | Value Field |
| --- | --- |
| 1 | Multipath data |
| 2 | Label stack |
| 3 | FEC stack change |

Label stack sub-TLV and FEC stack change sub-TLV are discussed below.

Figure 8:
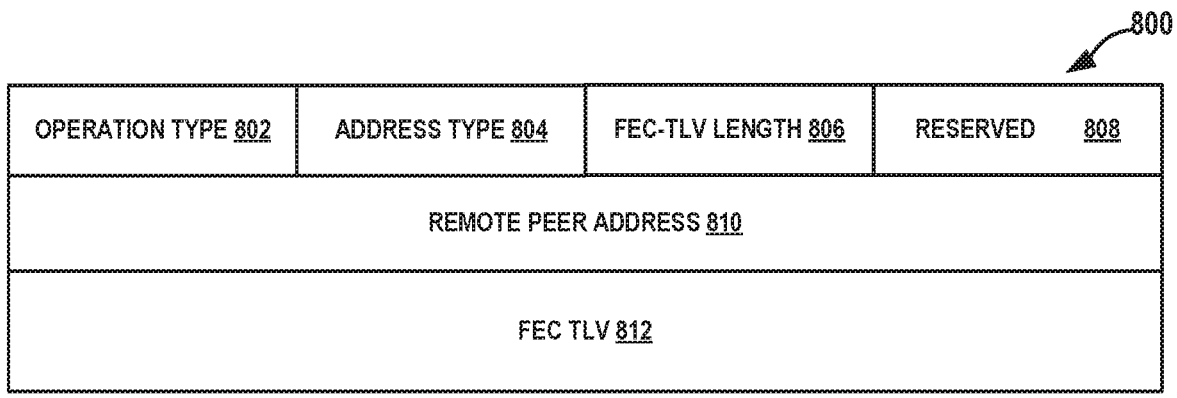
FIG. 8 illustrates the data structure of an exemplary FEC stack change sub-TLV.

FIG. 8 illustrates the data structure of an exemplary FEC stack change sub-TLV. A router (e.g., an LSP) includes a FEC stack change sub-TLV in the MPLS echo reply when the downstream node in the MPLS echo reply has a different FEC stack than the FEC stack received by the router in the MPLS echo request. A DDMAP TLV may include one or more FEC stack change sub-TLVs.

As shown in FIG. 8, FEC stack change sub-TLV 800 includes operation type field 802, address type field 804, FEC-TLV length field 806, reserved field 808, remote peer address field 810, and FEC TLV field 812. The value of operation type field 802 may specify the operation type associated with the FEC stack change and may be one of the following:

| Type # | Operation |
| --- | --- |
| 1 | PUSH |
| 2 | POP |

As such, a FEC stack change sub-TLV may indicate either a PUSH operation or a POP operation associated with a FEC stack change.

The value of address type field 804 may specify the remote peer's address type. The value of FEC-TLV length field 806 may specify the length of FEC TLV field 812. Reserved field 808 may be reserved for future use and the value of reserved field 808 may be set to zero. The value of remote peer address field 810 specifies the remote peer that is the next hop for the FEC being currently traced. If the operation type is PUSH, the value of remote peer address field 810 is the address of the peer from which the FEC being pushed was learned. If the operation type is POP, then the value of remote peer address field 810 may be set to Unspecified. In some examples, the value of remote peer address field 810 may be set to Unspecified if the router is hiding the remote peer's address.

The value of FEC TLV field 812 specifies the FEC associated with the FEC stack change operation, so that FEC TLV field 812 may contain one FEC from the list of FECs specified above for Target FEC stack sub-TLVs, including FECs such as LDP IPv4 prefix, LDP IPv6 prefix, RSVP IPv4 LSP, RSVP IPv6 LSP, Nil FEC, and the like. In some examples, for FEC stack change sub-TLV 800 having an operation type PUSH, the value of FEC TLV field 812 may be set to Nil FEC to hide the details of the FEC being pushed.

Figure 9:
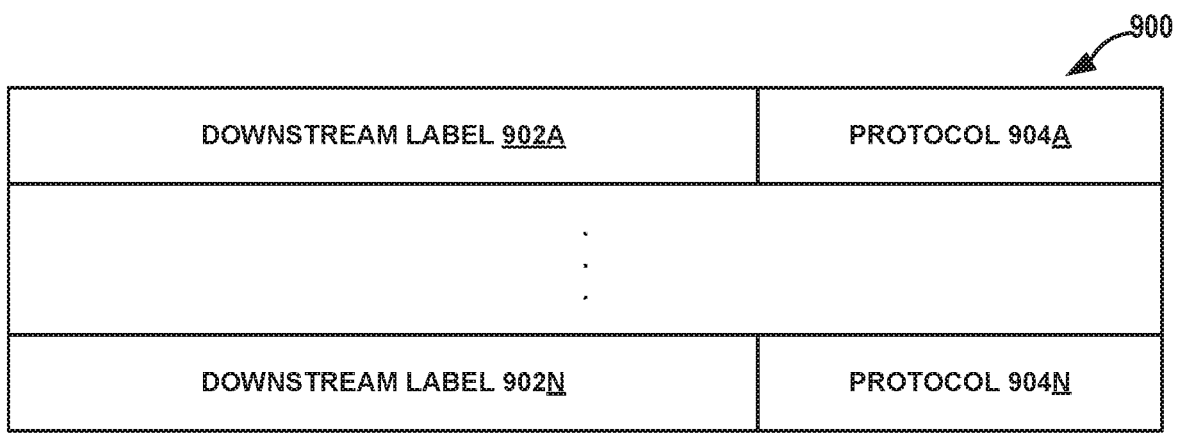
FIG. 9 illustrates the data structure of an exemplary label stack sub-TLV.

FIG. 9 illustrates the data structure of an exemplary label stack sub-TLV. The label stack sub-TLV in an MPLS echo reply sent by an LSP contains the set of labels in the label stack as it would have appeared if the LSP were forwarding the packet through the interface. A label stack sub-TLV in the same MPLS echo request or MPLS echo reply as a target FEC stack may include a label for each FEC in the target FEC stack of the same MPLS echo request or MPLS echo reply.

As shown in FIG. 9, label stack sub-TLV 900 includes downstream label fields 902A-902N associated with protocol fields 904A-904N. Each of downstream label fields 902A-902N includes a downstream label that is in the same format as an MPLS label minus the time-to-live field. The value of each of protocol fields 904A-904N specifies the label distribution protocol for the associated downstream label, and may be one of the following:

| Type # | Operation |
|---|---|
| 0 | Unknown |
| 1 | Static |
| 2 | BGP |
| 3 | LDP |
| 4 | RSVP-TE |

Figure 10A:
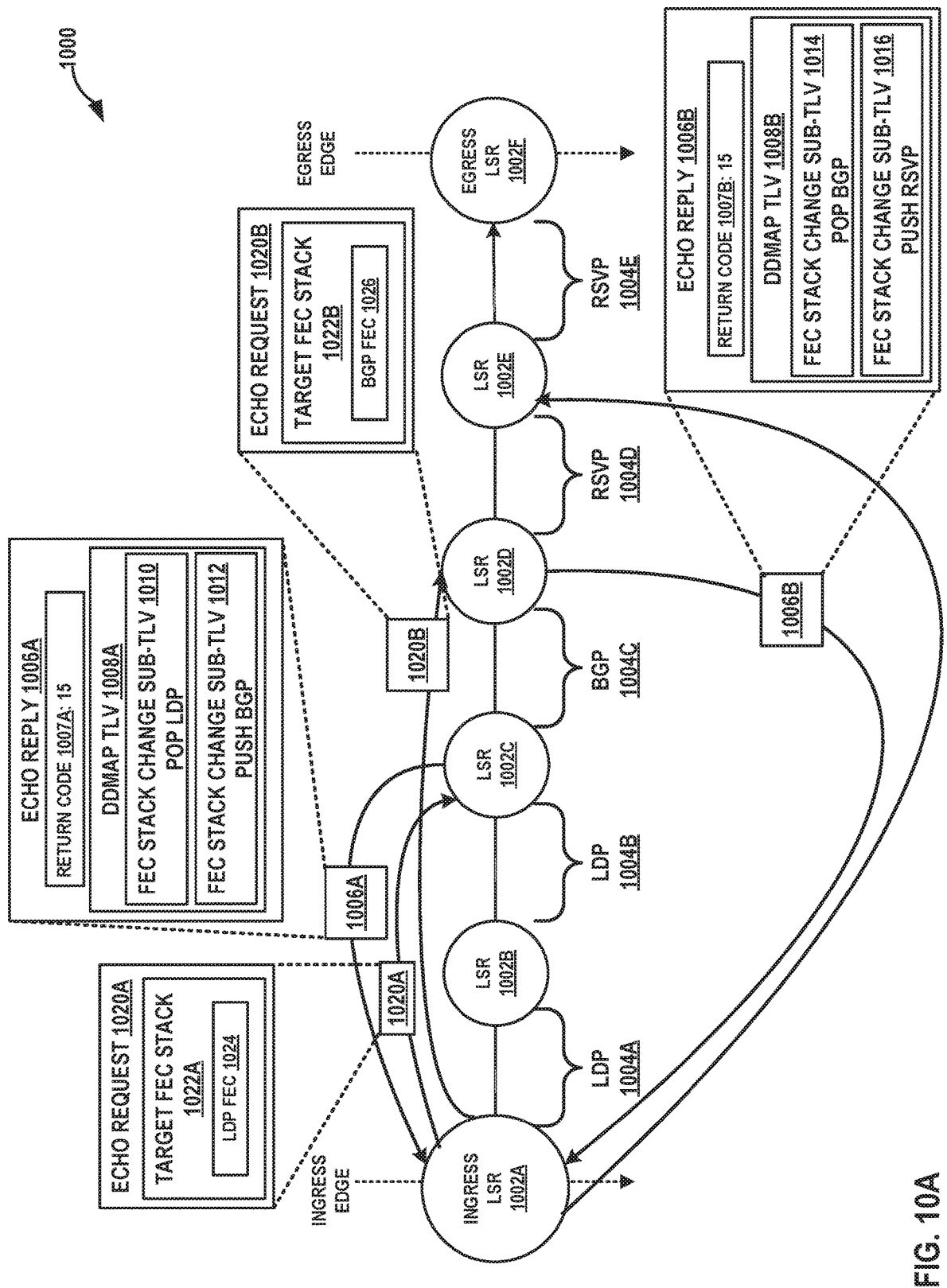
FIGS. 10A and 10B illustrate examples of stitched LSPs according to aspects of the present disclosure.
Figure 10B:
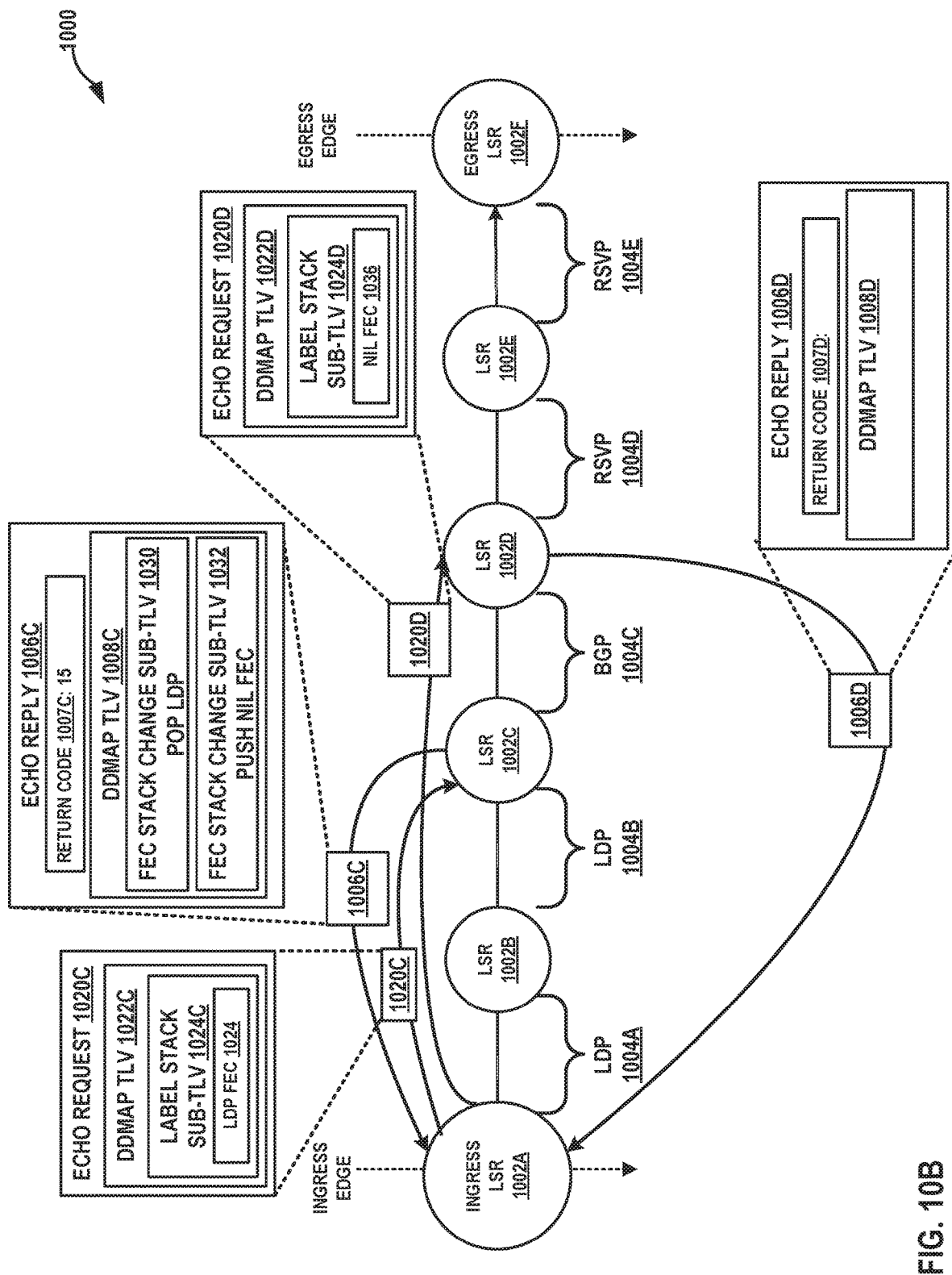

FIGS. 10A and 10B illustrate examples of stitched LSPs according to aspects of the present disclosure. In particular, FIGS. 10A and 10B illustrate the use of target FEC stacks, DDMAP TLVs, label stack sub-TLVs, and FEC stack change sub-TLVs, and Nil FEC described in FIGS. 3-9.

As shown in FIG. 10A, LSP 1000 includes LSRs 1002A-1002F. LSR 1002A is an ingress edge LSR at an ingress edge of LSP 1000 and LSR 1002F is an egress edge LSR at an egress edge of LSP 1000. There are three label-switched paths in LSP 1000: from LSR 1002A to LSR 1002C via Label Distribution Protocol (LDP) 1004A and 1004B, from LSR 1002C to LSR 1002D via Border Gateway Protocol (BGP) 1004C, and from LSR 1002D to LSR 1002F via Resource Reservation Protocol (RSVP) 1004E.

In a traceroute mode, the ingress edge LSR 1002A may identify a location of a fault in LSP 1000 by tracing an MPLS echo request packet's path from the ingress edge LSR 1002A to the egress edge LSR 1002F. As output, the traceroute typically shows how many hops the packet traveled to reach the egress edge LSR 1092F, identifies each hop, and shows how long each hop took.

Ingress edge LSR 1002A may send an MPLS echo request to each of LSRs 1002B-1002F in order to perform the traceroute. When an LSR receives an MPLS echo request, the receiver (one of LSRs 1002B-1002F) may verify whether the control plane and data plane are both healthy for the FEC Stack being pinged and whether the two planes are in sync. In response, the receiver sends an MPLS echo reply back to the ingress edge LSR 1002A indicating that the control plane and the data plane of the echo request are in sync, or an error message indicating that the control plane and the data plane of the echo request are not in sync.

The receiver may also include, in the MPLS echo reply, an indication of a change in label-switched paths at the receiver. In the example of LSP 1000, there is a switch from LDP 1004B to BGP 1004C at LSR 1002C. Ingress edge LSR 1002A may send MPLS echo request 1020A to LSR 1002C. MPLS echo request 1020A may include target FEC stack 1022A that indicates the FEC stack being tested. Because the label-switched path in LSP 1000 from LSR 1002B to LSR 1002C is LDP 1004A, target FEC stack 1022A of MPLS echo request 1020A indicates that LDP FEC 1024 is the FEC being tested. It should be noted that while MPLS echo requests and MPLS echo replies are described throughout this disclosure as including certain data, fields, and the like, such as including certain stacks or TLVs, MPLS echo requests and MPLS echo replies described throughout this disclosure may also include additional data, fields, and the like that are not explicitly described herein.

LSR 1002C may receive MPLS echo request 1020A and may respond by sending MPLS echo reply 1006A that indicates a change in label-switched path at LSR 1002C from LDP 1004B to BGP 1004C. For example, LSR 1002C may create MPLS echo request 1020A that includes DDMAP TLV 1008A that includes two FEC stack change sub-TLVs: FEC stack change sub-TLV 1010 that indicates a POP operation for the LDP FEC and FEC stack change sub-TLV 1012 that indicates a PUSH operation for the BGP FEC. LSR 1002C may also set the Return Code 1007A in MPLS echo reply 1006A to 15 to correspond to "Label switched with FEC change," thereby indicating a change in the FEC being traced.

LSR 1002C may send MPLS echo reply 1006A to ingress edge LSR 1002A to indicate to ingress edge LSR 1002A that there is a change in label-switched path at LSR 1002C from LDP 1004B to BGP 1004C. Ingress edge LSR 1002A may receive MPLS echo reply 1006A from LSR 1002C and may, in response, update the FEC stack according to the FEC Stack Change sub-TLVs 1010 and 1012 in MPLS echo reply 1006A by popping the LDP FEC from the target FEC stack and by pushing a BGP FEC to the target FEC stack. Thus, when ingress edge LSR 1002A formulates MPLS echo request 1020B for sending to LSR 1002D, ingress edge LSR 1002A may include in MPLS echo request 1020B target FEC stack 1022B that indicates BGP FEC 1026 as the FEC stack being tested.

Ingress edge LSR 1002A may send MPLS echo request 1020B to LSR 1002D and LSR 1002D may, in response to receiving MPLS echo request 1020B, send MPLS echo reply 1006B to ingress edge LSR 1002A. Similar to LSR 1002C, there is a switch from BGP 1004C to RSVP 1004D at LSR 1002D. Thus, LSR 1002D may include, in MPLS echo reply 1006B, an indication of a change in label-switched path at LSR 1002D from BGP 1004C to RSVP 1004D.

For example, LSR 1002D may create MPLS echo reply 1006B that includes DDMAP TLV 1008B that includes two FEC stack change sub-TLVs: FEC stack change sub-TLV 1014 that indicates a POP operation for the BGP FEC and FEC stack change sub-TLV 1016 that indicates a PUSH operation for the RSVP FEC. LSR 1002D may also set the Return Code 1007B in MPLS echo reply 1006B to 15 to correspond to "Label switched with FEC change," thereby indicating a change in the FEC being traced. LSR 1002D may send MPLS echo reply 1006B to ingress edge LSR 1002A to inform ingress edge LSR 1002A of the switch from BGP 1004C to RSVP 1004D at LSR 1002D.

In some examples, a transit node of an LSP, such as one or more of LSRs 1002A-1002F of LSP 1000, may use Nil FEC to skip FEC validation and to hide the details of a FEC element that it is pushing or stitching. As shown in FIG. 10B, LSR 1002C and LSR 1002D may use Nil FEC to hide the details of the change in label-switched paths at LSR 1002C and LSR 1002D.

Ingress edge LSR 1002A may send MPLS echo request 1020C to LSR 1002C that includes LDP FEC 1024 in label stack sub-TLV 1024C in DDMAP TLV 1022C to indicate that the FEC being tested is LDP FEC 1024. As shown in FIG. 10B, there is a switch from LDP 1004B to BGP 1004C at LSR 1002C. However, LSR 1002C may respond to MPLS echo request 1020C by sending MPLS echo reply 1006C that hides the details of the change in label-switched paths at LSR 1002C.

For example, LSR 1002C may create MPLS echo reply 1006C that includes DDMAP TLV 1008C that includes two FEC stack change sub-TLVs: FEC stack change sub-TLV 1030 that indicates a POP operation for the LDP FEC and FEC stack change sub-TLV 1032 that indicates a PUSH operation for a Nil FEC. Thus, instead of including in MPLS echo reply 1006C a FEC stack change sub-TLV that indicates a PUSH operation for the BGP FEC to indicate the change in label-switched paths at LSR 1002C, LSR 1002C instead includes FEC stack change sub-TLV 1032 that indicates a PUSH operation for a Nil FEC to hide the details of the change in label-switched paths at LSR 1002C. LSR 1002C may also set the Return Code 1007C in MPLS echo reply 1006C to "15" to correspond to "Label switched with FEC change," thereby indicating a change in the FEC being traced.

LSR 1002C may send MPLS echo reply 1006C to ingress edge LSR 1002A. Ingress edge LSR 1002A may receive MPLS echo reply 1006C from LSR 1002C and may, in response, update the FEC stack according to the FEC Stack Change sub-TLVs 1030 and 1032 in MPLS echo reply 1006C by popping the LDP FEC from the target FEC stack and by pushing a Nil FEC to the target FEC stack. Thus, when ingress edge LSR 1002A formulates MPLS echo request 1020D for sending to LSR 1002D, ingress edge LSR 1002A may include in MPLS echo request 1020D target FEC stack 1022D that indicates Nil FEC 1036 as the FEC stack being tested.

LSR 1002D may similarly hide the change in label-switched paths at LSR 1002D. Because LSR 1002B already used Nil FEC to perform FEC hiding, LSR 1002D may not include any FEC stack change sub-TLVs in MPLS echo reply 1006D that it sends to LSR 1002A in response to receiving MPLS echo request 1020D because the number of labels has not changed for the downstream of LSR 1002D and because the FEC type has also not changed (i.e., the target FEC stack 1022D already indicates Nil FEC 1036 as the FEC stack being tested). In this case, LSR 1002D may also not set Return Code 1007D in MPLS echo reply 1006D to indicate "Label switched with FEC change" (i.e., Return Code 15). LSR 1002D may send MPLS echo reply 1006D to LSR 1002A.

As can be seen in FIG. 10B, transit nodes (e.g., LSRs 1002B-1002E) of an LSP, such as LSP 1000, may use Nil FEC to hide changes in label-switched paths at the transit nodes. In some examples, transit nodes of an LSP may also use Nil FEC to hide the details of tunnels, as described below.

Figure 11:
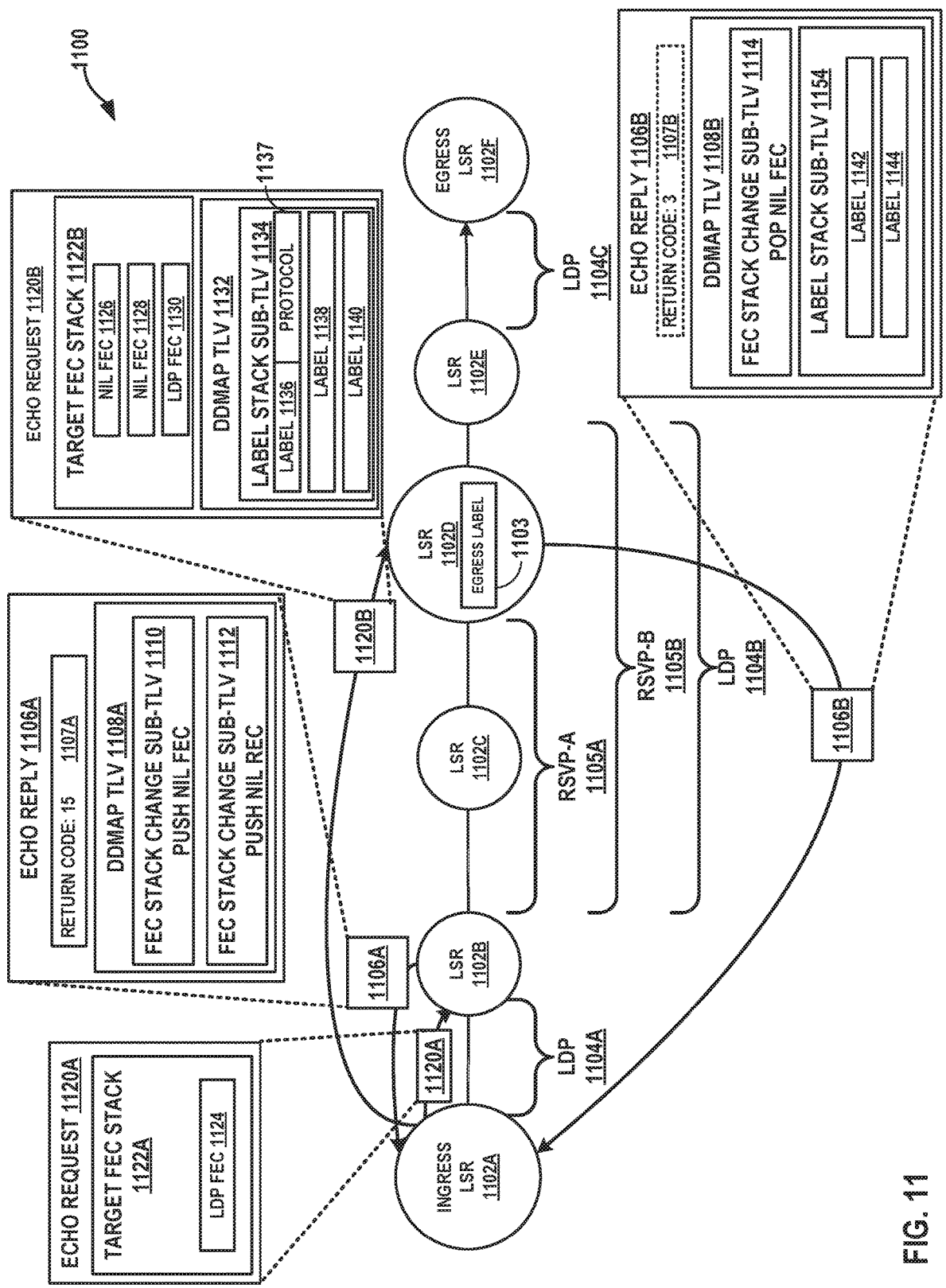
FIG. 11 illustrates an example MPLS LSP having one or more tunnels hidden via Nil FEC according to techniques of the present disclosure.

FIG. 11 illustrates an example MPLS LSP having one or more tunnels hidden via Nil FEC according to techniques of the present disclosure. As shown in FIG. 11, LSP 1100 is an end-to-end LDP LSP via LDPs 1104A-1104C from ingress edge LSR 1102A through LSRs 1102B-1102E to egress edge LSR 1102F. The end-to-end LDP LSP 1100 goes through RSVP-B 1105B from LSR 1102B to LSR 1102E. Further, RSVP-B 1105B also goes through RSVP-A 1105A from LSR 1102B to LSR 1102D. RSVP-A 1105A and RSVP-B 1105B are referred to herein as tunnels because end-to-end LDP LSP 1100 traverses through RSVP-A 1105A and RSVP-B 1105B. LSR 1102B is the ingress node for both RSVP-A 1105A and RSVP-B. LSR 1102D is the egress node for RSVP-A 1105A and LSR 1102E is the egress node for RSVP-B 1105B.

When performing MPLS traceroute, LSR 1102D may confirm whether it is the egress node for RSVP-A 1105A and may return, in its MPLS echo reply, an indication of whether LSR 1102D is the egress node for RSVP-A 1105A. Similarly, when performing MPLS traceroute, LSR 1102E may confirm whether it is the egress node for RSVP-B 1105B and may return, in its MPLS echo reply, an indication of whether LSR 1102E is the egress node for RSVP-B 1105B.

In the example of LSP 1100, ingress edge LSR 1102A may send MPLS echo request 1120A to LSR 1102B. MPLS echo request 1120A may include target FEC stack 1122A that indicates the FEC stack being tested. Because the label-switched path in LSP 1100 from LSR 1102A to LSR 1102B is LDP 1104A, target FEC stack 1122A of MPLS echo request 1120A indicates that LDP FEC 1124 is the FEC being tested.

Because LSR 1102B is the ingress node for tunnels RSVP-A 1105A and RSVP-B 1105B, LSR 1102B may receive MPLS echo request 1120A and may respond by sending MPLS echo reply 1106A that indicates LSR 1102B is the ingress node for tunnels RSVP-A 1105A and RSVP-B 1105B and details regarding tunnels RSVP-A 1105A and RSVP-B 1105B, such as indications of the egress nodes of tunnels RSVP-A 1105A and RSVP-B 1105B. However, in some examples, LSR 1102B may hide the details of tunnels RSVP-A 1105A and RSVP-B 1105B via Nil FEC.

For example, LSR 1102B may create MPLS echo reply 1106A that includes DDMAP TLV 1108A that includes two FEC stack change sub-TLVs: FEC stack change sub-TLV 1110 that indicates a PUSH operation for Nil FEC corresponding to RSVP-B 1105B and FEC stack change sub-TLV 1112 that indicates a PUSH operation for Nil FEC corresponding to RSVP-A 1105A. LSR 1102B may also set the Return Code 1107A in MPLS echo reply 1106A to 15 to correspond to "Label switched with FEC change," thereby indicating a change in the FEC being traced. Because LSR 1102B includes two PUSHes for Nil FECs corresponding to RSVP-A 1105A and RSVP-B 1105B in MPLS echo reply 1106A, MPLS echo reply 1106A may indicate that LSR 1102B is the ingress node for two tunnels but may not include certain information about tunnels RSVP-A 1105A and RSVP-B 1105B, such as the egress nodes for tunnels RSVP-A 1105A and RSVP-B 1105B in LSP 1100.

LSR 1102B may send MPLS echo reply 1106A to ingress edge LSR. Ingress edge LSR 1102A may receive MPLS echo reply 1106A from LSR 1102B and may, in response, update the FEC stack according to the FEC Stack Change sub-TLVs 1110 and 1112 in MPLS echo reply 1106A by pushing a Nil FEC the target FEC stack and by pushing a Nil FEC to the target FEC stack. Thus, when ingress edge LSR 1102A formulates additional MPLS echo requests for sending to LSRs downstream of LSR 1102B, the echo requests may include a target FEC stack that has a Nil FEC corresponding to RSVP-A 1105A at the top of the stack followed by a Nil FEC corresponding to RSVP-B 1105B and LDP FEC.

Ingress edge LSR 1102A may continue performing MPLS traceroute on LSP 1100 until it reaches LSR 1102D, which is an egress node of tunnel RSVP-A 1105A. Ingress edge LSR 1102A may send MPLS echo request 1120B to LSR 1102D. MPLS echo request 1120B may include target FEC stack 1122B that includes Nil FEC 1126 corresponding to RSVP-A 1105A at the top of FEC stack 1122B, Nil FEC 1128 corresponding to RSVP-B 1105B, and LDP FEC 1130 at the bottom of FEC stack 1122B. MPLS echo request 1106B may also include DDMAP TLV 1132 obtained by ingress edge LSR 1102A from the DDMAP TLV in the echo reply from the neighboring upstream node (i.e., LSR 1102C) to LSR 1102D. DDMAP TLV 1132 may include label stack sub-TLV 1134 that includes the downstream labels for each of the FECs indicated by FEC stack 1122B. For example, label stack sub-TLV 1134 includes downstream label 1136 for Nil FEC 1126, downstream label 1138 for Nil FEC 1128, and downstream label 1140 for LDP FEC 1128.

In total, label stack sub-TLV 1134 may have a total of three downstream labels 1136, 1138, and 1140 that correspond to the three FECs 1126, 1128, and 1130 in target FEC stack 1122B.

In response to receiving MPLS echo request 1120B, LSR 1102D may perform various checks to determine whether it is operating correctly, and may generate MPLS echo reply 1106B that LSR 1102D may send to ingress edge LSR 1102A. As part of determining whether it is operating correctly, LSR 1102D may determine whether it is an egress node for the FEC at the top of target FEC stack 1122B, which in this example is Nil FEC 1126 associated with the tunnel RSVP-A 1105A.

In some examples, LSR 1102D may determine whether it is an egress node for the FEC at the top of target FEC stack 1122B based on whether the number of labels towards next-hop is decreasing. If LSR 1102D determines that the number of labels towards next-hop is decreasing, the LSR 1102D may determine that it is an egress node for the FEC at the top of target FEC stack 1122B.

LSR 1102D may determine the number of downstream labels to include in label stack sub-TLV 1154 of MPLS echo reply 1106B and may compare the number of downstream labels to include in label stack sub-TLV 1154 of echo reply 1106B to than the number of labels in label stack sub-TLV 1134 of MPLS echo request 1120B. If LSR 1102 determines that the number of downstream labels to include in label stack sub-TLV 1154 of echo reply 1106B is less than the number of labels in label stack sub-TLV 1134 of MPLS echo request 1120B, LSR 1102D may determine that the number of labels towards next-hop is decreasing and that LSR 1102D is an egress node for the FEC at the top of target FEC stack 1122B.

LSR 1102D may determine that a packet may transit downstream from LSR 1102D to LSR 1102 via either RSVP-B 1105B or LDP 1104B. Thus, LSR 1102D may determine that the number of downstream labels to include in label stack sub-TLV 1154 of MPLS echo reply 1106B is two: downstream label 1142 for Nil FEC 1128 associated with RSVP-B 1105B and downstream label 1144 for LDP FEC 1130 associated with LDP 1104B. Meanwhile LSR 1102D may determine that label stack target sub-LTV 1132 in MPLS echo request 1120B includes three downstream labels: downstream labels 1136, 1138, and 1140. Thus, LSR 1102D may determine that the number of downstream labels to include in label stack sub-TLV 1154 of echo reply 1106B is less than the number of labels in label stack sub-TLV 1134 of MPLS echo request 1120B, and may therefore determine that LSR 1102D is an egress node for tunnel RSVP-A 1105A associated with Nil FEC 1126 at the top of target FEC stack 1122B.

In accordance with aspects of the present disclosure, an LSR such as LSR 1102D may be able to determine whether the LSR is an egress node of a tunnel without determining whether the number of labels towards next-hop is decreasing, as described above. For example, an LSP such as LSP 1500 may perform Ultimate Hop Popping (UHP) in which an egress node for a FEC may advertise an egress label to the adjacent upstream node for the FEC. An egress label may be an explicit null label or a non-null label that indicates to the adjacent upstream node that the LSR is the egress node. In some examples, the egress label may have a different value than label associated with the LSR for forwarding packets via labels through an LSP. Thus, when an LSR receives an MPLS echo request, the LSR may determine whether the MPLS echo request includes the egress label advertised by the LSR and, if so, may determine that the LSR is the egress node for the FEC.

In the example of FIG. 11, LSR 1102D may have, as part of label distribution, performed UHP by advertising an egress label 1103 and an associated protocol (e.g., BGP, LDP, or RSVP) to LSR 1102C. Thus, LSR 1102C may include egress label 1103 and the associated protocol in label stack sub-TLV 1134 of DDMAP TLV 1132 in MPLS echo reply 1106B. More specifically, LSR 1102C may include the egress label 1103 advertised by LSR 1102D in label stack sub-TLV 1134 in DDMAP TLV 1132 as downstream label 1136 associated with the FEC at the top of the target FEC stack (e.g., Nil FEC 1126), and may include the associated protocol as protocol 1137 in label stack sub-TLV 1134 in DDMAP TLV 1132.

LSR 1102D may, in response to receiving MPLS echo request 1120B, determine whether downstream label 1136 in label stack sub-TLV 1134 of MPLS echo request 1120B associated with Nil FEC 1126 at the top of target FEC stack 1122B in MPLS echo request 1120B matches the egress label 1103 advertised by LSR 1102D and whether protocol 1137 associated with downstream label 1136 in label stack sub-TLV 1134 of MPLS echo request 1120B matches the protocol of the egress label 1103 advertised by LSR 1102D. If LSR 1102D determines that downstream label 1136 matches (i.e., specify the same value as) the egress label 1103 advertised by LSR 1102D to LSR 1102C and if LSR 1102D determines that protocol 1137 associated with downstream label 1136 matches the protocol of the egress label 1103 advertised by LSR 1102D to LSR 1102C, LSR 1102D may determine that LSR 1102D is an egress node for Nil FEC 1126 at the top of target FEC stack 1122B without determining whether the number of labels towards next-hop is decreasing.

LSR 1102D may, in response to determining that it is an egress node for Nil FEC 1126 at the top of target FEC stack 1122B, include in MPLS echo reply 1106B an indication that it is an egress node for Nil FEC 1126 at the top of target FEC stack 1122B. For example, LSR 1102D may include, in MPLS echo reply 1106B, return code 1107B with a value of 3 that indicates that "replying router is an egress for the FEC at stack-depth <RSC>" and may include a return sub code (RSC) that indicates the stack depth of Nil FEC 1126 at the top of target FEC stack 1122B. In some examples, alternatively or in addition to returning return code 1107B with a value of 3, LSR 1102D may include, in MPLS echo reply 1106B, FEC stack change sub-TLV 1114 with a POP operation for Nil FEC in target FEC stack 1122B, thereby indicating that ingress edge LSR 1102A should pop the Nil FEC at the top of the target FEC stack. LSR 1102D may therefore send the MPLS echo reply 1106B to ingress edge LSR 1102A to indicate that LSR 1102D is the egress node for the Nil FEC corresponding to tunnel RSVP-A 1105A.

In some examples, an LSP may use techniques such as Penultimate Hop Popping (PHP) in which an LSR that is a penultimate node (e.g., adjacent upstream node) to the egress node of a tunnel may remove, for the FEC being traced, the label of the egress node of the tunnel in the DDMAP TLV. In PHP, the penultimate node may perform label switching to forward an implicit null label or an explicit null label. In this case the egress node of the tunnel may not be able to determine whether it is an egress node for the FEC at the top of the target FEC stack based on whether the number of labels towards next-hop is decreasing because the penultimate node has already removed the label of the egress node.

Figure 12:
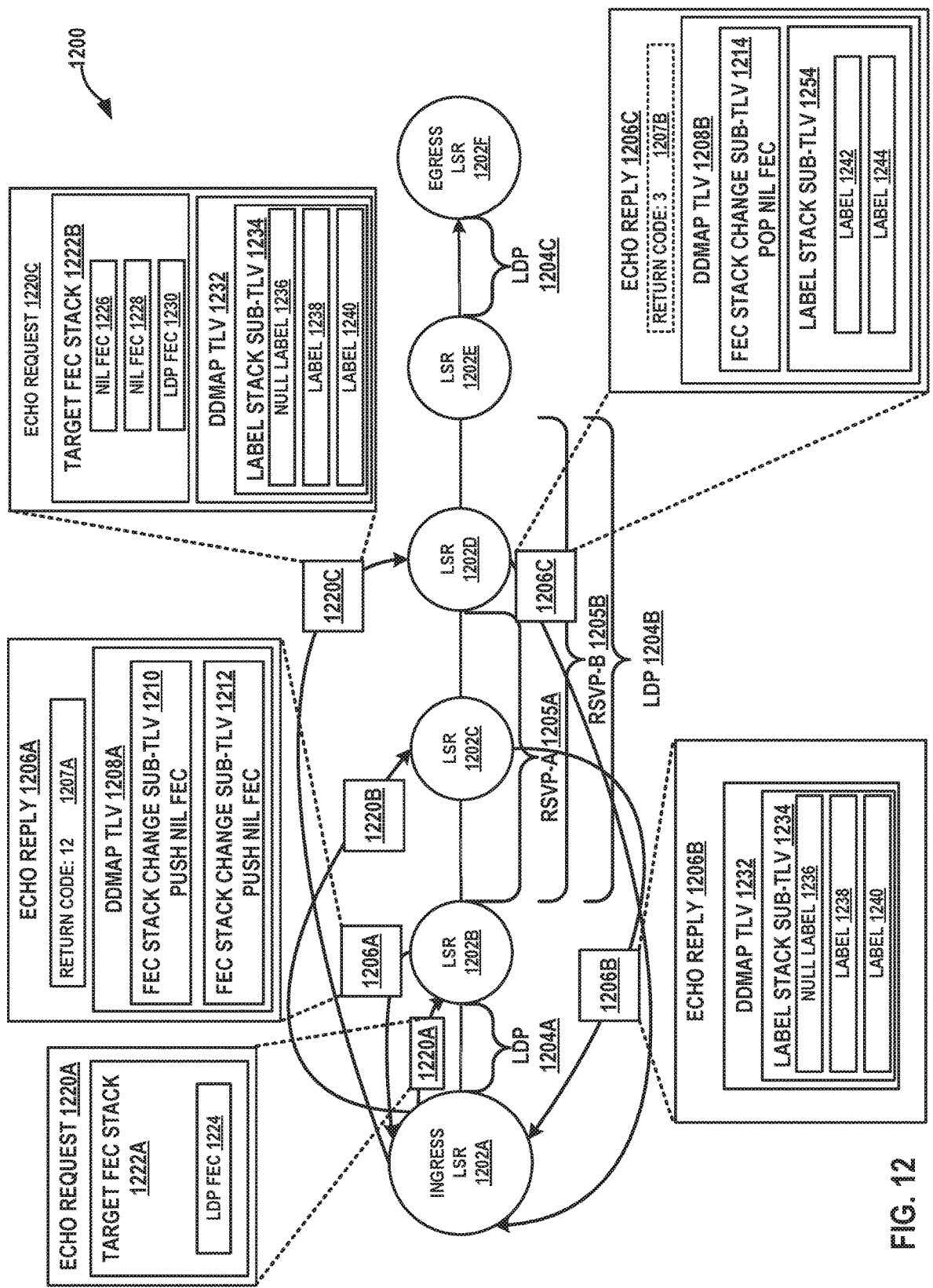
FIG. 12 illustrates an example MPLS LSP having one or more tunnels hidden via Nil FEC in which Penultimate Hop Popping is performed in the LSP, according to techniques of the present disclosure.

FIG. 12 illustrates an example MPLS LSP having one or more tunnels hidden via Nil FEC in which Penultimate Hop Popping is performed in the LSP, according to techniques of the present disclosure. As shown in FIG. 12, ingress edge LSR 1202A may send MPLS echo request 1220A to LSR 1202B. MPLS echo request 1220A may include target FEC stack 1222A that indicates the FEC stack being tested. Because the label-switched path in LSP 1200 from LSR 1202A to LSR 1202B is LDP 1204A, target FEC stack 1222A of MPLS echo request 1220A indicates that LDP FEC 1224 is the FEC being tested.

LSR 1202B may hide the details of tunnels RSVP-A 1205A and RSVP-B 1205B via Nil FEC. For example, LSR 1202B may create MPLS echo reply 1206A that includes DDMAP TLV 1208A that includes two FEC stack change sub-TLVs: FEC stack change sub-TLV 1210 that indicates a PUSH operation for Nil FEC corresponding to RSVP-B 1205B and FEC stack change sub-TLV 1212 that indicates a PUSH operation for Nil FEC corresponding to RSVP-A 1205A. LSR 1202B may also set the Return Code 1207A in MPLS echo reply 1206A to 12 to correspond to "Label switched with FEC change," thereby indicating a change in the FEC being traced. Because LSR 1202B includes two PUSHes for Nil FECs corresponding to RSVP-A 1205A and RSVP-B 1205B in MPLS echo reply 1206A, MPLS echo reply 1206A may indicate that LSR 1202B is the ingress node for two tunnels but may not include certain information about tunnels RSVP-A 1205A and RSVP-B 1205B, such as the egress nodes for tunnels RSVP-A 1205A and RSVP-B 1205B in LSP 1200.

LSR 1202B may send MPLS echo reply 1206A to ingress edge LSR. Ingress edge LSR 1202A may receive MPLS echo reply 1206A from LSR 1202B and may, in response, update the FEC stack according to the FEC Stack Change sub-TLVs 1210 and 1212 in MPLS echo reply 1206A by pushing a Nil FEC the target FEC stack and by pushing a Nil FEC to the target FEC stack. Thus, when ingress edge LSR 1202A formulates additional MPLS echo requests for sending to LSRs downstream of LSR 1202B, the echo requests may include a target FEC stack that has a Nil FEC corresponding to RSVP-A 1205A at the top of the stack followed by a Nil FEC corresponding to RSVP-B 1205B and LDP FEC.

Ingress edge LSR 1202A may continue traceroute of LSP 1200 by sending MPLS echo request 1220B to LSR 1202C, which is the penultimate node for an egress node of tunnel RSVP-A 1205A. In some examples, because LSR 1202C is the penultimate node for an egress node of tunnel RSVP-A 1205A, LSR 1202C may perform penultimate node popping. In MPLS, a penultimate node of a FEC may perform penultimate node popping to remove the outermost label of an MPLS tagged packet before the packet is forwarded to an adjacent egress node of the FEC. By removing the outer label, the adjacent egress node may save one cycle of label lookup, thereby potentially improving the performance of the adjacent egress node.

LSR 1202C may determine whether it is the penultimate node for the tunnel associated with the Nil FEC currently being traced. For example, if LSR 1202C receives a label stack along with MPLS echo request 1220B, LSR 1202C may lookup, in the label stack, the label associated with LSR 1202C in an incoming label map to determine if the label has been allocated and if an operation is associated with the label. In particular, LSR 1202C may determine whether the operation associated with the label is a penultimate hop popping operation. If LSR 1202C determines that the associated operation is a penultimate hop popping operation, LSR 1202C may determine that LSR 1202C is a penultimate node for the tunnel associated with the Nil FEC currently being traced.

As part of performing MPLS traceroute, if LSR 1202C determines that LSR 1202C is the penultimate node for the tunnel associated with the Nil FEC currently being traced, LSR 1202C may perform penultimate node popping by removing the label of the egress node (e.g., the label of LSR 1202D) of the FEC on the top of the target FEC stack from the label stack sub-TLV 1234 of the MPLS echo reply 1206B sent by LSR 1202C. By removing the label of the egress node from the label stack sub-TLV 1234 of the MPLS echo reply 1206B sent by LSR 1202C, label stack sub-TLV 1234 of the MPLS echo reply 1206B does not include the label advertised by the egress node. Instead, LSR 1202C may include null label 1236 in label stack sub-TLV 1234 of the MPLS echo reply 1206B along with downstream labels 1238 and 1240 associated with the other FECs in the target FEC stack.

A null label such as null label 1236 is a specialized label having a value that indicates the null label is not a regular label. For example, a null label may have a label value that is in a reserved labels range 0-12. In some examples, a null label may be an implicit null label if it has a label value of 3 and may be an explicit null label if it has a label value of 0. In MPLS, an explicit null label indicates that the label must be popped upon receipt, while an implicit null label is used to request label popping by the downstream LSR.

LSR 1202C may send MPLS echo reply 1206B to ingress edge LSR 1202A. LSR 1202A may, in response, send MPLS echo request 1220C to LSR 1202D. MPLS echo request 1220C includes target FEC stack 1222B containing Nil FEC 1226 that corresponds to RSVP-A 1205A at the top of target FEC stack 1222B and also includes Nil FEC 1228 that corresponds to RSVP-B 1205B and LDP FEC 1230 that corresponds to the end-to-end LDP LSP 1200. MPLS echo request 1220C also includes the same DDMAP TLV 1232 in MPLS echo reply 1206B sent by the adjacent upstream node LSR 1202C. DDMAP TLV 1232 includes label stack sub-TLV 1234 that includes null label 1236 for Nil FEC 1226, downstream label 1238 for Nil FEC 1228, and downstream label 1240 for LDP FEC 1230.

In accordance with aspects of the present disclosure, an LSR may determine whether it is the egress node for a tunnel in an LSP based at least in part on one or more labels in the MPLS echo request received by the LSP. The LSR may determine whether the label stack sub-TLV of the MPLS echo request includes a null label associated with the FEC at the top of the target FEC stack.

In the example of FIG. 12, LSR 1202D may determine whether it is an egress node for a tunnel associated with Nil FEC 1226 at the top of target FEC stack 1222B based at least in part on one or more labels in label stack sub-TLV 1234. More specifically, LSR 1202D may determine whether label stack sub-TLV 1234 includes a null label associated with Nil FEC 1226 at the top of target FEC stack 1222B. If LSR 1202D determines that label stack sub-TLV 1234 includes a null label associated with Nil FEC 1226 at the top of target FEC stack 1222B, LSR 1202D may determine that the adjacent upstream node (e.g., LSR 1202C) has performed penultimate hop popping for the FEC (e.g., Nil FEC 1226) at the top of target FEC stack 1222B and that LSR 1202D is an egress node for the tunnel (e.g., RSBP-A 1205A) associated with the FEC (e.g., Nil FEC 1226) at the top of target FEC stack 1222B.

As shown in FIG. 12, label stack sub-TLV 1234 in echo request 1220C includes null label 1236 at the top of label stack sub-TLV 1234 followed by downstream label 1238 and downstream label 1240. As described above, null label 1236 may be an explicit null label or an implicit null label based on the label value included in null label 1236. For example, null label 1236 may be an explicit null label if it includes a label value of 0 or may be an implicit null label if it includes a label value of 3. LSR 1202D may determine that label stack sub-TLV 1234 in echo request 1220C includes null label 1236 at the top of label stack sub-TLV 1234. Because null label 1236 is at the top of label stack sub-TLV 1234, LSR 1202D may determine that null label 1236 is associated with Nil FEC 1226 at the top of target FEC stack 1222B.

If LSR 1202D determines that the label stack sub-TLV 1234 of the MPLS echo request includes a null label 1236 associated with Nil FEC 1226 at the top of target FEC stack 1222B, LSR 1202D may determine that the adjacent upstream node (e.g., LSR 1202C) in the FEC has performed penultimate hop popping to include null label 1226 in label stack sub-TLV 1234 of DDMAP TLV 1232 instead of including the label advertised by LSR 1202D. LSR 1202D may therefore determine that because the label stack sub-TLV 1234 of the MPLS echo request includes a null label 1236 associated with Nil FEC 1226 at the top of target FEC stack 1222B, LSR 1202D is an egress node for the tunnel RSVP-A 1205A associated with Nil FEC 1226 at the top of target FEC stack 1222B.

Because the adjacent upstream node (e.g., LSR 1202C) in the FEC has performed penultimate hop popping to include null label 1226 in label stack sub-TLV 1234 of DDMAP TLV 1232 instead of including the label advertised by LSR 1202D, LSR 1202D is not able to determine whether LSR 1202D is an egress node for Nil FEC 1226 at the top of target FEC stack 1222B by determining whether he number of labels towards next-hop is decreasing. While label stack sub-TLV 1234 includes null label 1236, downstream label 1238, and downstream label 1240, LSRs, such as LSR 1202D, that perform the techniques of MPLS may not treat a null label, such as null label 1236, as a regular label. Instead, a null label may never be seen as a label by LSR 1202D. Thus, when LSR 1202D determines the number of downstream labels in label stack sub-TLV 1234, LSR 1202D may determine that there are two downstream labels in label stack sub-TLV 1234: downstream label 1238 and downstream label 1240.

Meanwhile, because the number of downstream labels that are downstream to LSR 1202D is also two because there is no downstream label for Nil FEC 1226 when the downstream label for Nil FEC 1226 in DDMAP TLV 1232 of MPLS echo request 1220C is null label 1236, the number of labels towards next-hop is therefore not decreasing from the point of LSR 1202D. As such, instead of determining whether LSR 1202D is an egress node for the tunnel RSVP-A 1205A associated with Nil FEC 1226 at the top of target FEC stack 1222B based on determining whether the number of labels towards next-hop is decreasing, LSR 1202D may, instead, 1202D is an egress node for the tunnel RSVP-A 1205A associated with Nil FEC 1226 at the top of target FEC stack 1222B because label stack sub-TLV 1234 of the MPLS echo request includes a null label 1236 associated with Nil FEC 1226 at the top of target FEC stack 1222B, LSR.

As such, an LSR may determine whether it is the egress node for a tunnel in an LSP without determining whether the number of labels towards next-hop is decreasing. In this way, the techniques described in the present disclosure provides a technical advantage of being able to correctly determine whether an LSR is the egress node for a tunnel even when a penultimate node of the tunnel performs penultimate hop popping.

In response to determining that the LSR 1202D is the egress node for the tunnel RSVP-A 1205A in LSP 1200, LSR 1202D may send MPLS echo reply 1206C to ingress edge LSR 1202A that indicates LSR 1202D as being the egress node for the tunnel 1205A in LSP 1200.

For example, LSR 1202D may include, in MPLS echo reply 1206C, a return code indicative of LSR 1202D being the egress node for the tunnel 1205A in LSP 1200. In particular, LSR 1202D may include return code 1207B with a value of 3 that indicates that "replying router is an egress for the FEC at stack-depth <RSC>" and may include a return sub code (RSC) that indicates the stack depth of Nil FEC 1226 at the top of target FEC stack 1222B. In some examples, alternatively or in addition to returning return code 1207B with a value of 3, LSR 1202D may include, in MPLS echo reply 1206C, FEC stack change sub-TLV 1214 with a POP operation for Nil FEC 1226 in target FEC stack 1222B, thereby indicating that ingress edge LSR 1202A should pop Nil FEC 1226 at the top of the target FEC stack 1222B.

LSR 1202D may also include label stack sub-TLV 1254 in DDMAP TLV 1208B of MPLS echo reply 1206C. Label stack sub-TLV 1254 may include downstream labels 1242 and 1244 corresponding to Nil FEC 1228 and LDP FEC 1230 in target FEC stack 1222B. Note that LSR 1202D is also the penultimate node for Nil FEC 1228 corresponding to tunnel RSVP-B 1205B. Thus, in some instances, LSR 1202D may look up label 1238 in label stack sub-TLV 1234 of MPLS echo request 1220C in LSR 1202D's incoming label map to determine whether LSR 1202D is a penultimate node for Nil FEC 1228 corresponding to tunnel RSVP-B 1205B.

If LSR 1202D determines that LSR 1202D is a penultimate node for Nil FEC 1228 corresponding to tunnel RSVP-B 1205B, such as according to the techniques described above, LSR 1202D may perform penultimate hop popping for Nil FEC 1228 by including a null label in label stack sub-TLV 1254 that corresponds to Nil FEC 1228 instead of downstream label 1242. The null label may be implicit null label or explicit null label.

LSR 1202D may therefore send the MPLS echo reply 1206C to ingress edge LSR 1202A to indicate that LSR 1202D is the egress node for Nil FEC 1226 in target FEC stack 1222B corresponding to tunnel RSVP-A 1405A. Ingress edge LSR 1202A may, in response to receiving MPLS echo reply 1206C, pop a Nil FEC from the top of the target FEC stack and may therefore continue performing MPLS traceroute for LSRs 1202E and 1202F of LSP 1200.

For example, LSR 1202D may send an MPLS echo request (not shown) to LSR 1202E that includes DDMAP TLV 1208B of MPLS echo reply 1206C. LSR 1202E may perform the techniques similar to that described above with respect to LSR 1202E to determine whether it is an egress node for a tunnel in LSP 1200. For example, if label stack sub-TLV 1254 of DDMAP TLV 1208B in the MPLS echo request includes a null label associated with a Nil FEC at the top of the target FEC stack in the MPLS echo request, LSR 1202D may determine it is an egress node for the tunnel RSVP-B 1205B associated with the Nil FEC at the top of the target FEC stack. LSR 1202E may therefore send an MPLS echo reply (not shown) to ingress edge LSR 1202A that indicates LSR 1202E as being the egress node for the tunnel RSVP-B 1205B associated with the Nil FEC at the top of the target FEC stack, similar to MPLS echo reply 1206C sent by LSR 1202D.

Ingress edge LSR 1202A may, in response, pop Nil FEC from the target FEC stack so that only LDP FEC remains on the target FEC stack. Ingress edge LSR 1202A may continue on and send an MPLS echo request (not shown) to egress edge LSR 1202F and egress edge LSR 1202F may, in response, send an MPLS echo reply (not shown) to ingress edge LSR 1202A that LSR 1202F is the egress for LSP 1200, such as an MPLS echo reply that indicates EGRESS_OK. Because the MPLS echo reply sent by egress edge LSR 1202F is the response for the last FEC (LDP FEC) for the target FEC stack, ingress edge LSR 1202A may stop performing MPLS traceroute for LSP 1200.

Figure 13:
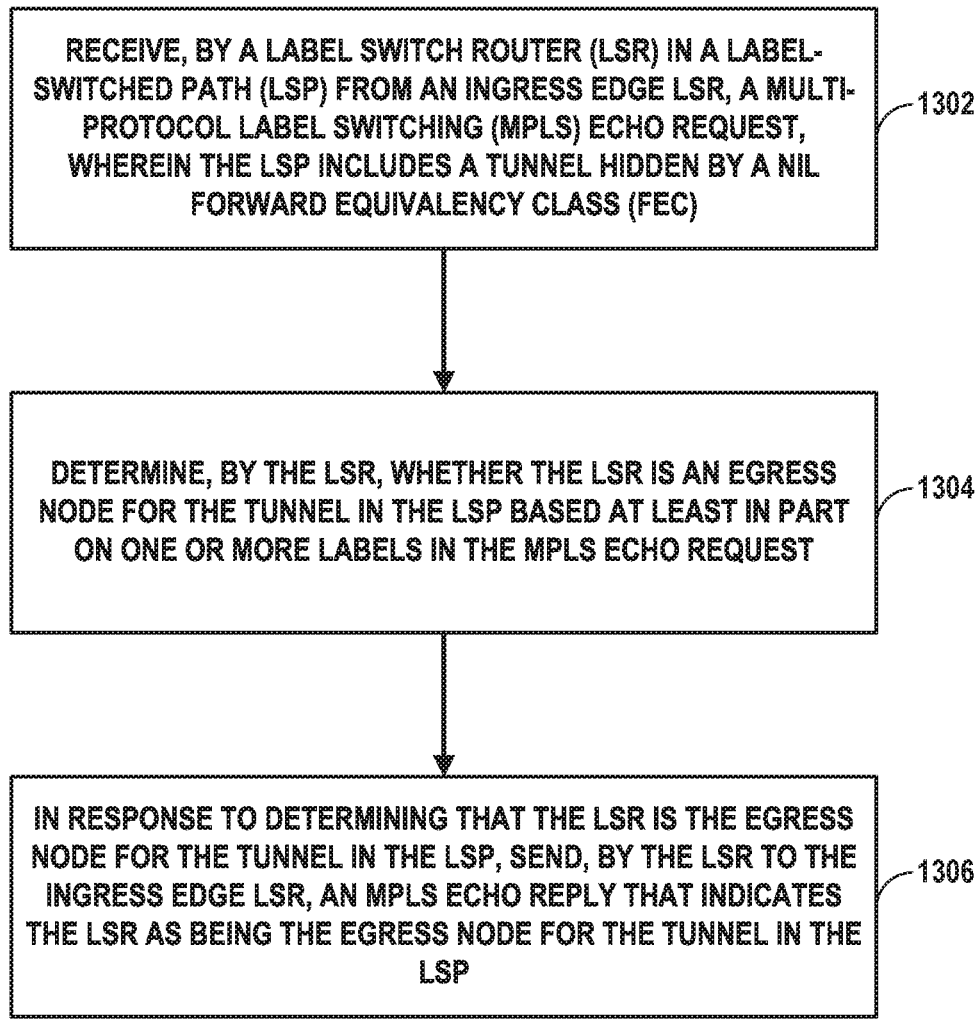
FIG. 13 is a flowchart illustrating an example process for identifying the egress node of a tunnel having its detailed hidden using Nil FEC, according to aspects of the present disclosure.

FIG. 13 is a flowchart illustrating an example process for identifying the egress node of a tunnel having its detailed hidden using Nil FEC, according to aspects of the present disclosure. The example operation is described herein with respect to components within LSP 1200 of FIG. 12. Similar operations may be performed by components of FIGS. 1, 10A-10B, and 11.

As shown in FIG. 13, LSR 1202D in a LSP 1200 may receive, from an ingress edge LSR 1202A, a MPLS echo request 1220C, wherein the LSP 1200 includes a tunnel hidden by a Nil Forward Equivalency Class (FEC) (1302). In some examples, LSR 1202D is not an edge LSR (e.g., egress edge LSR 1202D) of LSP 1200.

LSR 1202D may determine whether the LSR 1202D is an egress node for the tunnel in the LSP 1200 based at least in part on one or more labels 1236, 1238, and 1240 in the MPLS echo request 1220C (1304).

In some examples, LSR 1202D may determine whether an adjacent upstream node 1202C to the LSR 1202D in the LSP 1200 has performed penultimate hop popping (PHP) to remove a label associated with the LSR 1202D. For example, LSR 1202D may determine whether a label stack sub-TLV 1234 in a DDMAP TLV 1232 in the MPLS echo request 1220C includes one of: an implicit null label or an explicit null label and, in response to determining that the label stack sub-TLV 1234 in the DDMAP TLV 1232 includes one of: the implicit null label or the explicit null label, determine that the LSR 1202D is the egress node for the tunnel in the LSP 1200.

In some examples, LSR 1202D may determine whether a label stack sub-TLV 1234 in the MPLS echo request 1220C includes an egress label advertised by the LSR 1202D. LSR 1202D may, in response to determining that the label stack sub-TLV 1234 in the MPLS echo request 1220C includes the egress label advertised by the LSR 1202D, determine that the LSR 1202D is the egress node for the tunnel in the LSP 1200.

LSR 1202D may, in response to determining that the LSR 1202D is the egress node for the tunnel in the LSP 1200, send an MPLS echo reply 1206C that indicates the LSR 1202D as being the egress node for the tunnel in the LSP 1200 (1306). In some examples, LSR 1202D may send, to the ingress edge LSR 1202A, the MPLS echo reply 1206C that includes a return code 1207B indicative of the LSR 1202D being the egress node for the tunnel in the LSP 1200. In some examples, LSR 1202D may, in response to determining that the LSR 1202D is the egress node for the tunnel in the LSP 1200, send an MPLS echo reply 1206C that includes a FEC stack change sub-TLV 1214 that indicates a POP operation to pop the Nil FEC.

In some examples, LSR 1202D may determine whether the LSR 1202D is a penultimate node for a second tunnel having details that are hidden by a second Nil FEC. LSR 1202D may, in response to determining that the LSR 1202D is the penultimate node for the second tunnel in the LSP, include, in a label stack sub-TLV 1254 in a DDMAP TLV 1280B in the MPLS echo reply 1206C, an indication that an adjacent downstream node 1202E in the LSP 1200 is an egress node for the second tunnel.

Figure 14:
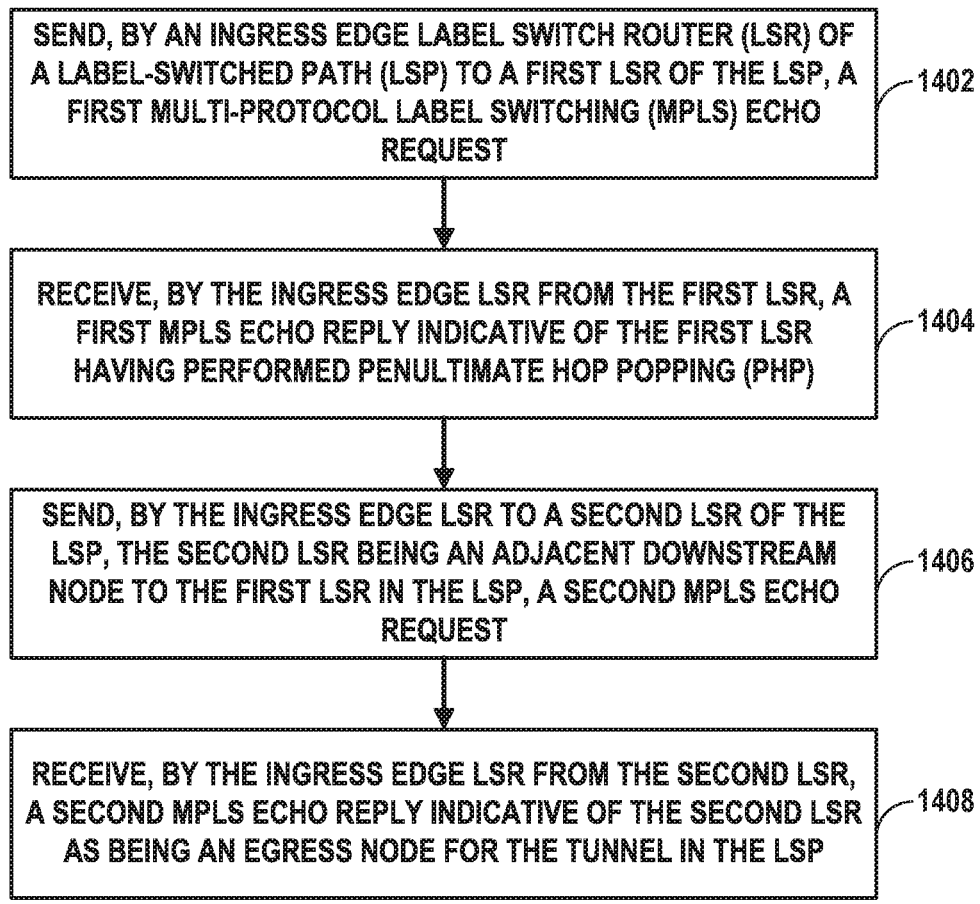
FIG. 14 is a flowchart illustrating an example process for identifying the egress node of a tunnel having its details hidden using Nil FEC, according to aspects of the present disclosure.

FIG. 14 is a flowchart illustrating an example process for identifying the egress node of a tunnel having its detailed hidden using Nil FEC, according to aspects of the present disclosure. The example operation is described herein with respect to components within LSP 1200 of FIG. 12. Similar operations may be performed by components of FIGS. 1, 10A-10B, and 11.

As shown in FIG. 14, an ingress edge label switch router (LSR) 1202A of a label-switched path (LSP) 1200 may send to a first LSR 1202C of the LSP 1200, a first Multi-Protocol Label Switching (MPLS) echo request 1220B, wherein the LSP 1200 includes a tunnel (e.g., RSVP-A 1205A) hidden by a Nil Forward Equivalency Class (FEC) (1402).

The ingress edge LSR 1202A may receive, from the first LSR 1202C a first MPLS echo reply 1206B indicative of the first LSR 1202C having performed Penultimate Hop Popping (PHP) (1404). In some examples, the ingress edge LSR 1202A may receive, from the first LSR 1202C, the first MPLS echo reply 1206B that includes a label stack sub-TLV 1234 that contains a null label 1236 associated with the Nil FEC. For example, the null label comprises an implicit null label or an explicit null label.

The ingress edge LSR 1202A may send, to a second LSR 1202D of the LSP 1200, the second LSR 1202D being an adjacent downstream node to the first LSR 1202C in the LSP 1200, a second MPLS echo request 1220C (1406). In some examples, the ingress edge LSR 1202A may send, to the second LSR 1202D, the second MPLS echo request 1220C that includes the label stack sub-TLV 1234 that contains the null label 1236 associated with the Nil FEC.

The ingress edge LSR 1202A may receive, from the second LSR 1202D, a second MPLS echo reply 1206C indicative of the second LSR 1202D as being an egress node for the tunnel in the LSP 1200 (1408). In some examples, the ingress edge LSR 1202A may receive, from the second LSR 1202D, the second MPLS echo reply 1206C that includes a return code 1207B indicative of the second LSR 1202D being the egress node for the tunnel in the LSP 1200. In some examples, the ingress edge LSR 1202A may receive, from the second LSR 1202D, the second MPLS echo reply 1206C that includes a FEC stack change sub-TLV 1214 that indicates a POP operation to pop the Nil FEC.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of the techniques have been described. These and other aspects are within the scope of the following claims.

What is claimed is:

1. A method comprising:
    receiving, by a label switch router (LSR) in a label-switched path (LSP) from an ingress edge LSR, a Multi-Protocol Label Switching (MPLS) echo request, wherein the LSP includes a tunnel hidden by a Nil Forward Equivalency Class (FEC);
    determining, by the LSR, whether the LSR is an egress node for the tunnel hidden by the Nil FEC in the LSP based at least in part on determining whether one or more labels in the MPLS echo request includes one of: a null label forwarded by an adjacent upstream node to the LSR in the LSP, or an egress label advertised by the LSR; and
    in response to determining that the LSR is the egress node for the tunnel in the LSP, sending, by the LSR to the ingress edge LSR, an MPLS echo reply that indicates the LSR as being the egress node for the tunnel in the LSP.

2. The method of claim 1, wherein determining whether the LSR is the egress node for the tunnel comprises:
    determining, by the LSR, whether the adjacent upstream node to the LSR in the LSP has performed penultimate hop popping (PHP) to remove a label associated with the LSR.

3. The method of claim 2, wherein determining whether the adjacent upstream node to the LSR in the LSP has performed PHP to remove the label associated with the LSR comprises:
    in response to determining that the adjacent upstream node to the LSR in the LSP has performed PHP, determining, by the LSR, whether a label stack sub-Type-Length-Value (TLV) in the MPLS echo request includes one of: an implicit null label or an explicit null label; and
    in response to determining that the label stack sub-TLV in the MPLS echo request includes one of: the implicit null label or the explicit null label, determining, by the LSR, that the LSR is the egress node for the tunnel in the LSP.

4. The method of claim 1, wherein determining whether the LSR is the egress node for the tunnel comprises:
    determining, by the LSR, whether a label stack sub-TLV in the MPLS echo request includes the egress label advertised by the LSR; and
    in response to determining that the label stack sub-TLV in the MPLS echo request includes the egress label advertised by the LSR, determining, by the LSR, that the LSR is the egress node for the tunnel in the LSP.

5. The method of claim 1, wherein sending the MPLS echo reply to the ingress edge LSR that indicates the LSR as being the egress node for the tunnel in the LSP comprises sending, by the LSR to the ingress edge LSR, the MPLS echo reply that includes a return code indicative of the LSR being the egress node for the tunnel in the LSP.

6. The method of claim 1, wherein sending the MPLS echo reply to the ingress edge LSR that indicates the LSR as being the egress node for the tunnel in the LSP comprises sending, by the LSR to the ingress edge LSR, the MPLS echo reply that includes a FEC stack change sub-TLV that indicates a POP operation to pop the Nil FEC.

7. The method of claim 1, further comprising:
    determining whether the LSR is a penultimate node for a second tunnel having details that are hidden by a second Nil FEC;
    in response to determining that the LSR is the penultimate node for the second tunnel in the LSP, including, in a label stack sub-TLV in the MPLS echo reply, an indication that an adjacent downstream node in the LSP is an egress node for the second tunnel.

8. A label switch router (LSR) in a label-switched path (LSP), the LSR comprising:
    one or more interfaces configured to receive, from an ingress edge LSR, a Multi-Protocol Label Switching (MPLS) echo request, wherein the LSP includes a tunnel hidden by a Nil Forward Equivalency Class (FEC); and a control unit in communication with the one or more interfaces, the control unit comprising one or more processors configured to determine whether the LSR is an egress node for the tunnel hidden by the Nil FEC in the LSP based at least in part on determining whether one or more labels in the MPLS echo request includes one of: a null label forwarded by an adjacent upstream node to the LSR in the LSP, or an egress label advertised by the LSR;

wherein the one or more interfaces are configured, in response to determining that the LSR is the egress node for the tunnel in the LSP, to send, to the ingress edge LSR, an MPLS echo reply that indicates the LSR as being the egress node for the tunnel in the LSP.

9. The LSR of claim 8, wherein to determine whether the LSR is the egress node for the tunnel, the one or more processors are further configured to determine whether the adjacent upstream node to the LSR in the LSP has performed penultimate hop popping (PHP) to remove a label associated with the LSR.

10. The LSR of claim 9, wherein to determine whether the adjacent upstream node to the LSR in the LSP has performed PHP to remove the label associated with the LSR, the one or more processors are further configured to:

in response to determining that the adjacent upstream node to the LSR in the LSP has performed PHP, determine whether a label stack sub-TLV in the MPLS echo request includes one of: an implicit null label or an explicit null label; and in response to determining that the label stack sub-TLV in the MPLS echo request includes one of: the implicit null label or the explicit null label, determine that the LSR is the egress node for the tunnel in the LSP.

11. The LSR of claim 8, wherein to determine whether the LSR is the egress node for the tunnel, the one or more processors are further configured to:

determine whether a label stack sub-TLV in the MPLS echo request includes the egress label advertised by the LSR; and in response to determining that the label stack sub-TLV in the MPLS echo request includes the egress label advertised by the LSR, determine that the LSR is the egress node for the tunnel in the LSP.

12. The LSR of claim 8, wherein to send the MPLS echo reply to the ingress edge LSR that indicates the LSR as being the egress node for the tunnel in the LSP, the one or more interfaces are further configured to send, to the ingress edge LSR, the MPLS echo reply that includes a return code indicative of the LSR being the egress node for the tunnel in the LSP.

13. The LSR of claim 8, wherein to send the MPLS echo reply to the ingress edge LSR that indicates the LSR as being the egress node for the tunnel in the LSP, the one or more interfaces are further configured to send, to the ingress edge LSR, the MPLS echo reply that includes a FEC stack change sub-TLV that indicates a POP operation to pop the Nil FEC.

14. The LSR of claim 8, wherein the one or more processors are further configured to:

determine whether the LSR is a penultimate node for a second tunnel having details that are hidden by a second Nil FEC; and in response to determining that the LSR is the penultimate node for the second tunnel in the LSP, include, in a label stack sub-TLV in the MPLS echo reply, an indication that an adjacent downstream node in the LSP is an egress node for the second tunnel.

15. A method comprising:

sending, by an ingress edge label switch router (LSR) of a label-switched path (LSP) to a first LSR of the LSP, a first Multi-Protocol Label Switching (MPLS) echo request, wherein the LSP includes a tunnel hidden by a Nil Forward Equivalency Class (FEC);

receiving, by the ingress edge LSR from the first LSR, a first MPLS echo reply indicative of the first LSR having performed Penultimate Hop Popping (PHP) including receiving, by the ingress edge LSR from the first LSR, the first MPLS echo reply that includes a label stack sub-TLV that contains a null label associated with the Nil FEC;

sending, by the ingress edge LSR to a second LSR of the LSP, the second LSR being an adjacent downstream node to the first LSR in the LSP, a second MPLS echo request that includes the label stack sub-TLV received from the first LSR that contains the null label associated with the Nil FEC; and receiving, by the ingress edge LSR from the second LSR, a second MPLS echo reply indicative of the second LSR as being an egress node for the tunnel in the LSP.

16. The method of claim 15, wherein the null label comprises one of: an implicit null label or an explicit null label.

17. The method of claim 15, wherein receiving, by the ingress edge LSR from the second LSR, the second MPLS echo reply indicative of the second LSR as being the egress node for the tunnel in the LSP further comprises:

receiving, by the ingress edge LSR from the second LSR, the second MPLS echo reply that includes a return code indicative of the second LSR being the egress node for the tunnel in the LSP.

18. The method of claim 15, wherein receiving, by the ingress edge LSR from the second LSR, the second MPLS echo reply indicative of the second LSR as being the egress node for the tunnel in the LSP further comprises:

receiving, by the ingress edge LSR from the second LSR, the second MPLS echo reply that includes a FEC stack change sub-TLV that indicates a POP operation to pop the Nil FEC.

\* \* \* \* \*